US009568136B2

(12) United States Patent
Fadell et al.

(10) Patent No.: US 9,568,136 B2
(45) Date of Patent: Feb. 14, 2017

(54) SEPARATELY REPLACEABLE SEAL SYSTEMS FOR USE WITH A PRESSURE TRANSMITTER

(71) Applicant: Rosemount Inc., Chanhassen, MN (US)

(72) Inventors: Paul Fadell, Spring Park, MN (US); Liu Yang, Beijing (CN)

(73) Assignee: Rosemount, Inc., Chanhassen, MN (US)

( * ) Notice: Subject to any disclaimer, the term of this patent is extended or adjusted under 35 U.S.C. 154(b) by 404 days.

(21) Appl. No.: 13/804,979

(22) Filed: Mar. 14, 2013

(65) Prior Publication Data

US 2014/0265306 A1    Sep. 18, 2014

(51) Int. Cl.
  *G01L 19/00*  (2006.01)
  *F16L 39/00*  (2006.01)

(52) U.S. Cl.
  CPC .............. *F16L 39/00* (2013.01); *G01L 19/003* (2013.01)

(58) Field of Classification Search
  CPC .............. G01L 19/003; G01L 19/0007; G01L 19/0046; F16L 39/00
  USPC ....................................................... 285/120.1
  See application file for complete search history.

(56) References Cited

U.S. PATENT DOCUMENTS

| | | | |
|---|---|---|---|
| 4,833,922 A | 5/1989 | Frick et al. | |
| 4,993,754 A | 2/1991 | Templin, Jr. | |
| D317,266 S | 6/1991 | Broden et al. | |
| D318,432 S | 7/1991 | Broden et al. | |
| 5,248,167 A | 9/1993 | Petrich et al. | |
| 5,920,016 A | 7/1999 | Broden | |
| 6,003,219 A * | 12/1999 | Frick et al. | ................ 29/25.41 |
| 6,389,904 B1 | 5/2002 | Petrich et al. | |
| 6,675,655 B2 | 1/2004 | Broden et al. | |
| 6,675,658 B2 | 1/2004 | Petrich et al. | |
| 7,258,017 B1 | 8/2007 | Hedtke | |
| 7,290,452 B2 | 11/2007 | Hedtke | |
| 7,434,469 B2 | 10/2008 | Hedtke | |
| 7,472,608 B2 | 1/2009 | Hedtke | |
| 8,099,856 B2 | 1/2012 | Lutz | |
| 2003/0177837 A1 | 9/2003 | Broden et al. | |
| 2005/0072242 A1 | 4/2005 | Fandrey | |

(Continued)

FOREIGN PATENT DOCUMENTS

| | | |
|---|---|---|
| CN | 1447096 A | 10/2003 |
| CN | 203455132 U | 2/2014 |

(Continued)

OTHER PUBLICATIONS

General instructions for Handling and Installation of Rosemount 1199 Seal Systems, Rosemount 1199, Quick Installation Guide 00825-0100-4016, Rev BA, Aug. 2011, 8 pgs.

(Continued)

*Primary Examiner* — Daniel P Stodola
*Assistant Examiner* — Zachary Dragicevich
(74) *Attorney, Agent, or Firm* — Westman, Champlin & Koehler, P.A.

(57) ABSTRACT

A replaceable seal system with high and low sides connectable to a coplanar inlet plate on a pressure transmitter. A first side of the seal system can be replaced without disturbing the sealing of a second side of the seal system. The seal system includes a stack of first and second plates with a central split line. At least one of the first and second plates is split along the central split line to provide for separate replacement on only one side of the system.

21 Claims, 21 Drawing Sheets

(56) References Cited

U.S. PATENT DOCUMENTS

| | | | |
|---|---|---|---|
| 2007/0220985 A1 | 9/2007 | Hedtke | |
| 2008/0223140 A1* | 9/2008 | Broden | ............... G01L 19/0046 73/718 |
| 2012/0085180 A1 | 4/2012 | Carton et al. | |
| 2014/0090476 A1* | 4/2014 | Miller et al. | .................... 73/706 |

FOREIGN PATENT DOCUMENTS

| | | |
|---|---|---|
| JP | 2011-508878 | 3/2011 |
| WO | WO 97/22855 | 6/1997 |

OTHER PUBLICATIONS

International Search Report and Written Opinion dated Jun. 27, 2014 for corresponding International Application No. PCT/US2014/014394, filed Feb. 3, 2014.
Communication pursuant to Rules 161(1) and 162 EPC for European Patent Application No. 14706716.9, dated Oct. 21, 2015, 2 pages.
First Office Action including Search Report for Chinese Patent Application No. 201310334255.7, dated Aug. 25, 2015, 9 pages.
Office Action from Chinese Patent Application No. 201310334255.7, dated Mar. 2, 2016.
Office Action from Chinese Patent Application No. 201310334255.7, dated May 16, 2016.
Communication from European Patent Application No. 14706716.9, dated Nov. 8, 2016.
Office Action from Chinese Patent Application No. 201310334255.7, dated Oct. 24, 2016.
Office Action from Japanese Patent Application No. 2016-500196, dated Oct. 26, 2016.

* cited by examiner

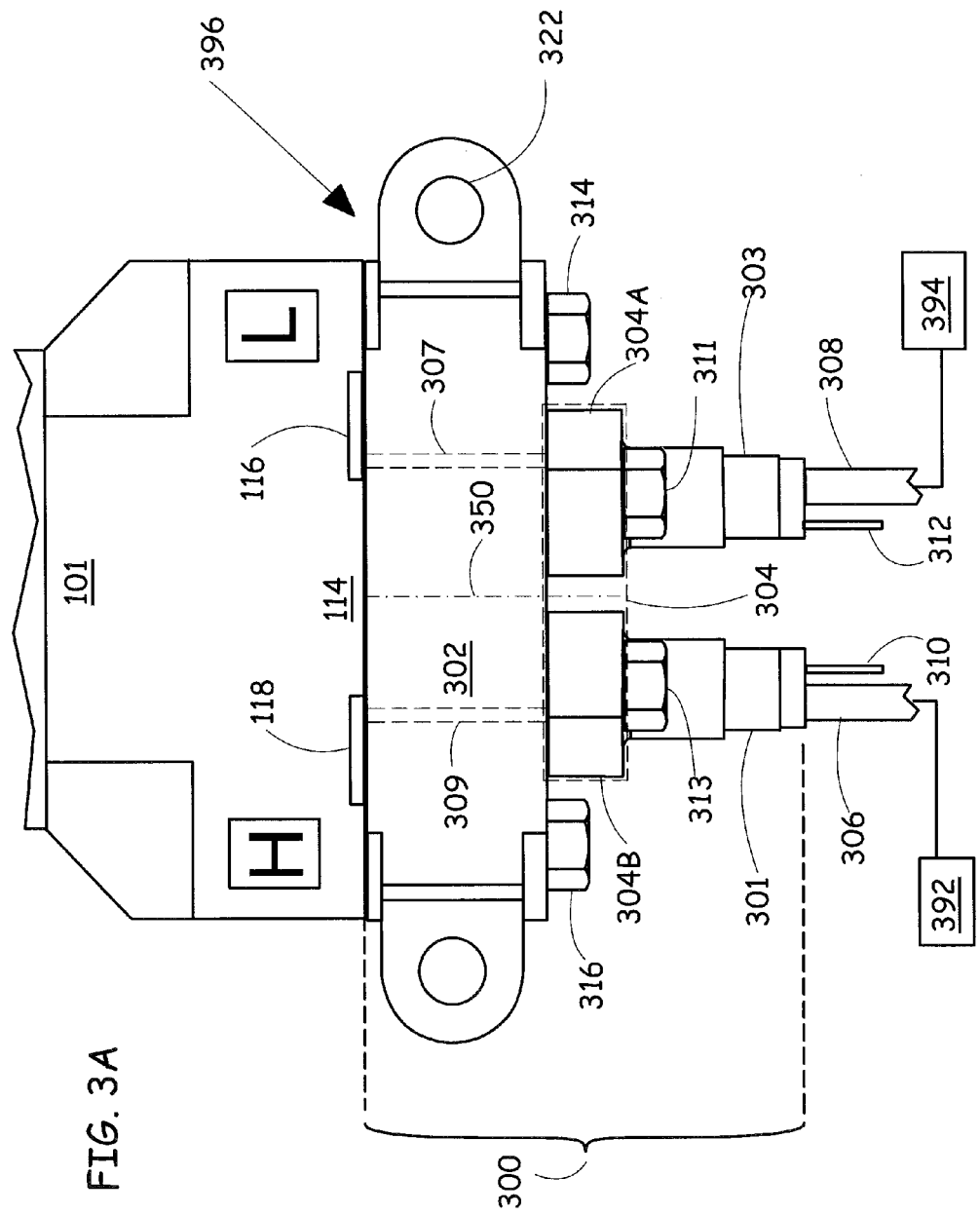

SEPARATELY REPLACEABLE SEAL SYSTEMS FOR USE WITH A PRESSURE TRANSMITTER

BACKGROUND OF THE INVENTION

The present invention relates to seal systems for use with industrial process pressure transmitters. More specifically, the present invention relates to such seal systems that include a seal that couples a pressure to a coplanar inlet plate of a differential pressure transmitter.

Industrial process control systems are used to monitor and control industrial processes use to produce or transfer liquids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a differential pressure transmitter which measures two pressures of process fluids and provides an output related to a pressure difference between the two measured pressures. This pressure difference may, in turn, represent a differential pressure, a flow rate, a level of process fluid in a vessel, or other process variable. The transmitter is configured to transmit information related to the differential pressure back to the central control room. The transmission is typically sent over a two wire process control loop, however, other communication techniques may be used, including wireless techniques.

The pressures must be coupled to the process variable transmitter through some type of process couplings. For example, the process fluid can comprise a component used in an industrial process such as natural gas, oil, etc. In certain process measurement applications, the pressure transmitter is located remotely relative to the pressurized process fluid, and pressures are physically conveyed from the process fluid to the pressure transmitter through a fluid link called a remote seal.

In some applications, an assembly of two seals couples two pressures (high side and low side pressures) to a coplanar inlet plate of a differential pressure transmitter. When one of the seals requires replacement, the assembly of two seals is disconnected from the coplanar inlet plate. Disconnection from the coplanar inlet plate results in breaking open both high and low side seal systems, and the entire assembly must be replaced at great expense. There is a need to improve seal systems that attach to coplanar inlet plates so that the cost of replacing a single damaged seal is reduced.

SUMMARY

A seal system is couplable to a coplanar inlet plate of a pressure transmitter. The seal system comprises a first plate assembly. The first plate assembly includes first plate assembly bolt holes, at least some of which are alignable with coplanar inlet plate bolt holes. The first plate assembly comprises first high and low side isolator fluid passages that are alignable with the high and low side diaphragms of the coplanar inlet plate.

The seal system comprises a second plate assembly. The second plate assembly is stacked on the first plate assembly to form a plate stack that includes the first and second plate assemblies. The second plate assembly includes second plate assembly bolt holes aligned with first plate assembly bolt holes.

The seal system comprises high and low side capillary connectors. The high and low side capillary connectors connect to the plate stack. The high and low side capillary connectors have second high and low side isolator fluid passages that are aligned with the first high and low side fluid passages.

The seal system comprises capillaries that connect to the capillary connector. The seal system comprises seals that connect to the capillaries.

The plate stack includes a central split line separating high and low side components of one of the first and second plate assemblies that enables separate replacement of a selected one of high and low side components while avoiding replacing a non-selected one of the high and low side components, and vice versa.

BRIEF DESCRIPTION OF THE DRAWINGS

FIGS. 3A-3E illustrate an embodiment of a replaceable dual remote seal system.

DETAILED DESCRIPTION

In the exemplary embodiments described below in FIGS. 1-5, 8-9, replaceable seal systems are disclosed. The replaceable seal systems are useful with differential pressure transmitters that have coplanar inlet plates. Each replaceable seal system includes at least one of a high side seal system and a low side seal system. In particular, each replaceable seal system has a seal system on one side that is separately replaceable without replacing the other side.

With the use of a replaceable dual seal system, a high side seal system can be unsealed for replacement without unsealing the low side seal system, and vice versa. The arrangement avoids an expensive problem with known dual seal systems on transmitters with coplanar inlet plates in which it is necessary to replace both high and low side systems, even if only one of the two systems is damaged or obsolete and requires replacement.

Figure 1A:
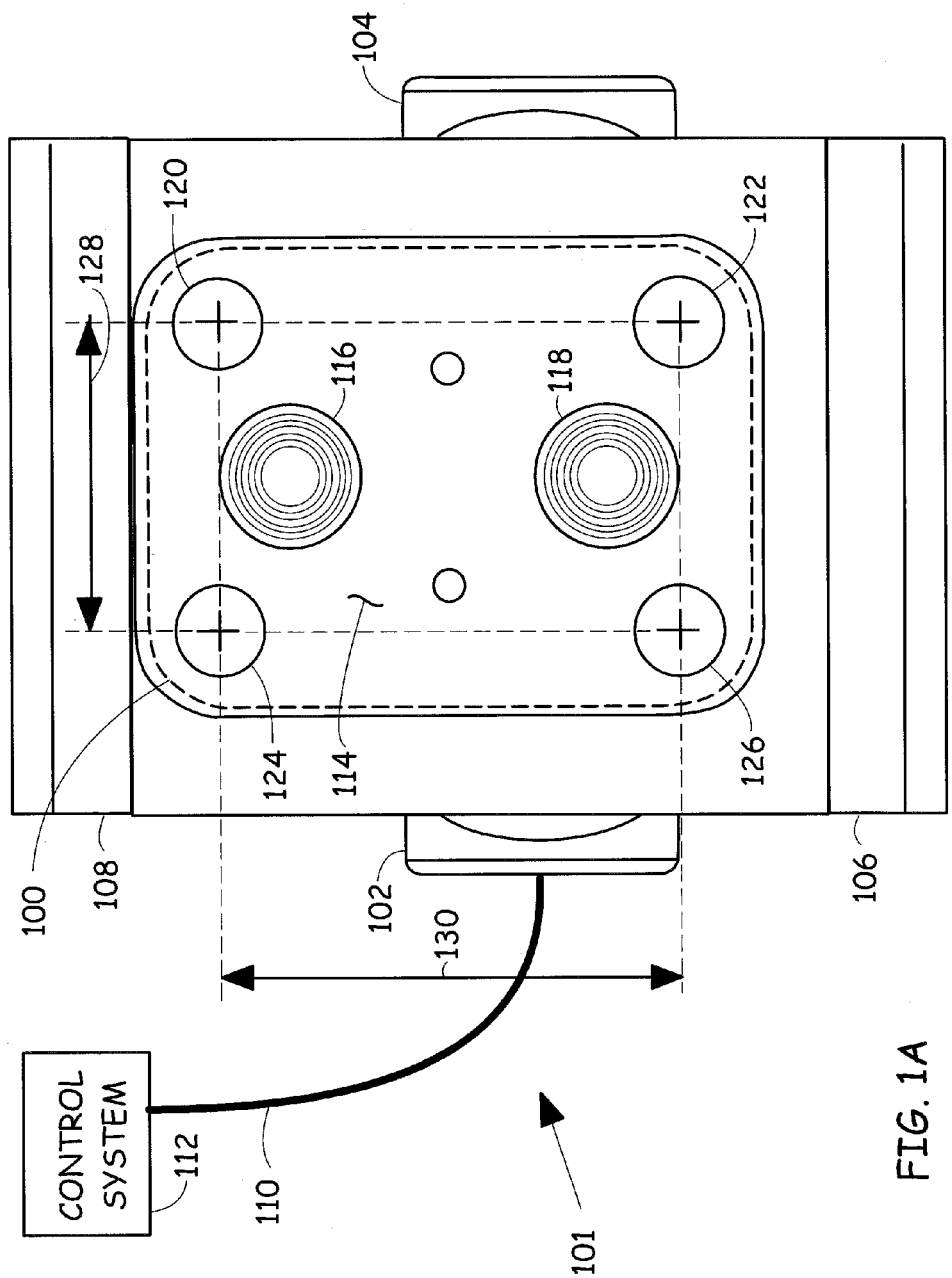
FIGS. 1A-1B illustrate an embodiment of a replaceable dual remote seal system.
Figure 1B:
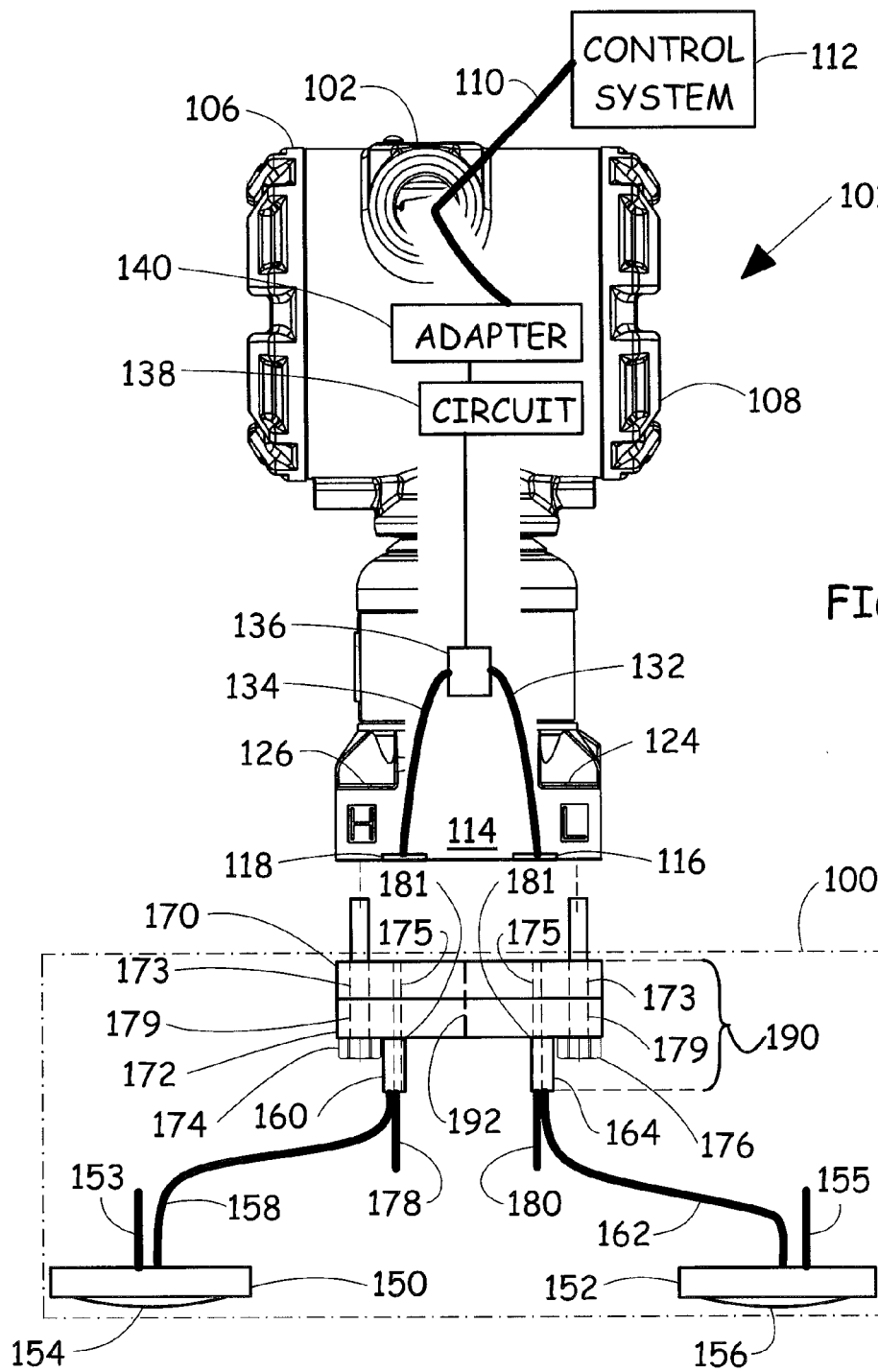

FIGS. 1A, 1B schematically illustrate a replaceable dual remote seal system 100 positioned for connection to an exemplary coplanar inlet plate 114 of a differential pressure transmitter 101.

FIG. 1A schematically illustrates the replaceable remote seal system 100 positioned on a bottom surface of the coplanar inlet plate 114 of the differential pressure transmitter 101.

The differential pressure transmitter 101 includes conduit hubs 102, 104 for connection of one or more wiring conduits (not illustrated) to the transmitter 101. The differential pressure transmitter 101 includes a first cover 106 that is removable to provide service access to a transmitter wiring compartment (not illustrated in FIG. 1A). The differential pressure transmitter 101 includes a second cover 108 that is removable to provide service access to an electronic circuit board compartment (not illustrated in FIG. 1A) in the transmitter 101. The differential pressure transmitter 101 couples a transmitter output signal along a line 110 through the conduit hub 102 to an industrial control system 112. The pressure transmitter 101 provides an output signal representative of differential pressure on the line 110 to the industrial control system 112.

The differential pressure transmitter 101 includes the miniaturized process fluid connection referred to here as the coplanar inlet plate 114. The coplanar inlet plate 114 of the pressure transmitter 101 is connectable to two fluid pressures, called high (H) and low (L) side pressures (not illustrated in FIG. 1A), present in an industrial plant environment. The coplanar inlet plate 114 includes two miniature isolation diaphragms 116, 118 that are arranged to be generally coplanar with one another and with a bottom surface of the coplanar inlet plate 114. The miniature isolation diaphragms 116, 118 are sealed barriers that isolate fluids outside the transmitter 101 from isolation fluids (not illustrated in FIG. 1A) inside the transmitter 101. The miniature isolation diaphragms 116, 118 deflect responsive to external fluid pressures to permit pressures to be communicated through the miniature isolation diaphragms 116, 118 without exposing internal parts of the transmitter 101 to external fluids. The transmitter 101 is exemplary, and other known configurations of transmitters with coplanar inlets plates can be used as well.

Referring here to FIG. 1B, the isolation fluids inside the transmitter 101 are contained in capillary tubes 132, 134 that couple pressures from the miniature isolation diaphragms 116, 118 to a pressure sensor 136 (or sensors) inside the transmitter 101.

As illustrated in FIG. 1A, the coplanar inlet plate 114 includes a rectangular pattern of four bolt holes 120, 122, 124, 126. The rectangular pattern of bolt holes 120, 122, 124, 126 has a first bolt hole spacing 128 that matches bolt hole spacings on industry standard flange adapter unions (FAUs, described in more detail below in connection with FIG. 12). The rectangular pattern of four bolt holes 120, 122, 124, 126 has a second bolt hole spacing 130 that is a width needed to permit a first flange adapter union aligned with bolt holes 120, 124, but not yet bolted to bolt holes 120, 124, to rotate on a tapered threaded process pipe without striking a second flange adapter union that is bolted to bolt holes 122, 126. Flange adapter unions are not used when the replaceable dual remote seal system 100 is connected to the transmitter 101, however, the dual remote seal system 100 is compatibly sized for the first and second bolt hole spacings 128, 130, and diameters of the bolt holes 120, 122, 124, 126. According to one aspect, the first bolt hole spacing 128 is 1.63 inches, and the second bolt hole spacing 130 is 2.126 inches. The bolt hole spacings are less than 1.7 inches by 2.2 inches, which provides for highly miniaturized connections. According to another aspect, the inside diameters of the bolt holes 120, 122, 124, 126 are either threaded for 7/16"-20 bolts, or sized as a clearance holes for 7/16"-bolts, in which case nuts are used to secure the bolts.

The bolt holes 120, 122, 124, 126 are sized and positioned to receive bolts that provide the compressive force needed to press the replaceable dual remote seal system 100 against the coplanar inlet plate 114 and to seal the coplanar inlet plate 114 and the replaceable dual remote seal system 100 together around the peripheral edges of isolator diaphragms 116, 118.

The term "coplanar inlet plate", as used in this application, means a contiguous plate that is part of a differential pressure transmitter and that surrounds high and low pressure isolation diaphragms and a rectangular pattern of four peripheral bolts holes. The high and low pressure isolation diaphragms define a diaphragm plane that is parallel with a plate plane that is defined by the contiguous flat plate. Terms such as "high and low pressures" and "high and low sides", as used in this application, refer to the nominally higher and lower pressure sides (relative to one another) of a differential pressure transmitter and an associated replaceable seal system. The term "replacement" as used in this application refers to replacing a damaged local or remote seal, replacing one seal type with a different type of seal when a current local or remote seal is obsoleted by installation change.

FIG. 1B illustrates a schematic exploded front view of the differential pressure transmitter 101 and the replaceable dual remote seal system 100 in FIG. 1A. The differential pressure transmitter 101 is miniaturized and includes the micro electrical mechanical system (MEMS) pressure sensor 136 that is fabricated from silicon, glass, ceramics or metal, and miniaturized electronics 138, 140 that includes a low power microprocessor-based analog-to-digital (A/D) circuit 138 and one or more serial digital communication bus adapters 140 such as HART, PROFIBUS, PROFINET, FOUNDATION FIELDBUS, ETHERNET/IP, FIELD DEVICE INTEGRATION (FDI), wireless or an analog communication output such as a 4-20 mA control loop for communication with the industrial system 112.

In certain field applications, an industrial plant environment encountered near a process fluid vessel can be so extreme that the differential pressure transmitter 101 will be damaged by the extreme environment. In other applications, an isolator diaphragm may be needed that is larger than the miniature isolation diaphragms 116, 118 in order to accommodate process fluid characteristics such as high viscosity or particulate content. In such applications the differential pressure transmitter 101 is placed in a location that is remote from the process fluid vessel.

As illustrated in FIG. 1B, the replaceable dual remote seal system 100 includes a high (H) pressure side remote seal 150 and a low (L) pressure side remote seal 152. The remote seals 150, 152 have remote seal isolator diaphragms 154, 156 that are larger in diameter than the miniature isolation diaphragms 116, 118 of the differential pressure transmitter 101. The high pressure side remote seal 150 includes a process fill tube 153. The low pressure side remote seal 152 includes a process fill tube 155. The high pressure side remote seal 150 is coupled by a capillary tube 158 (also called a capillary) to a capillary connector 160. The low pressure side remote seal 152 is coupled by a capillary tube 162 (also called a capillary) to a capillary connector 164. The remote seals 150, 152, the capillary tubes 158, 162 (also called capillaries) and the capillary connectors 160, 164 are filled with isolator fluids. The capillary connectors 160, 164 include process fill tubes 178, 180. According to one aspect, the use of process fill tubes 153, 155 connected near distal ends of the capillary tubes 158, 162 and the use of process fill tubes 178, 180 connected near proximal ends of the capillary tubes 158, 162 provides improved purging of air when high and low side systems are filled with isolation fluids.

The replaceable dual remote seal system 100 includes a first plate assembly 170 and a second plate assembly 172 that are stacked on one another as illustrated, and that are bolted to the coplanar inlet plate 114 with bolts such as bolts 174, 176. The bolt 174 engages the hole 126, and the bolt 176 engages the bolt hole 124. The first and second plate assemblies 170, 172 are arranged to provide fluid connection with isolator fluids between the capillary connectors 160, 164 and the miniature isolation diaphragms 116, 118. The first and second plate assemblies 170, 172 are arranged to permit a selected first one of the high side and low side remote seals 150, 152 to be replaced without disturbing sealing of a second one of the high side and low side remote seals 150, 152. The first and second plate assemblies 170, 172, taken together, comprise a plate stack 190. The plate stack 190 comprises a central split line 192 between the high and low sides. At least one of the first plate assembly 170 and the second plate assembly 172 is split into two separate parts along the central split line 192 to provide economical replaceability. The use of a stack of two plate assemblies 170, 172, with a central split line 192, permits a separate replaceability of high and low side isolator systems.

In a preferred arrangement, the capillaries 158, 162 are long to permit positioning the differential pressure transmitter 101 about 3 to 15 meters away from a process fluid pressure vessel (not illustrated in FIGS. 1A, 1B), in an environment that is not hostile to the differential pressure transmitter 101. Remote positioning of the differential pressure transmitter 101 is desirable when process fluids are corrosive, extremely hot, viscous at room temperature, subject to high vibration, dangerous to handle or that include particles that would otherwise tend to clog small process lines leading to FAUs on a pressure transmitter. According to one aspect, the replaceable dual remote seal system 100 can be used for differential pressure (DP) level sensing applications, for differential pressure (DP) flow applications, for meeting sanitary or hygienic specifications, or for providing specialized types of process connections.

During initial manufacture, the replaceable dual remote seal system 100 is assembled with bolts to the coplanar inlet plate 114 on the pressure transmitter 101 to form high and low side isolator systems that are closed (sealed) except for high and low side process fill tubes 153, 155, 178, 180, which are open. After assembly, the assembled and sealed high and low side systems are evacuated and are filled with clean isolator fluid through the process fill tubes 153, 155, 178, 180. The quantity of isolator fluid in each side of the dual remote seal system 100 is adjusted to provide precisely controlled isolator fluid quantities that expand remote isolator diaphragms 154, 156 of the remote seals 150, 152 so that the remote isolator diaphragms 154, 156 are near a midrange of slack deflection ranges of the remote isolator diaphragms 154, 156, and then the process fill tubes 153, 155, 178, 180 are closed (sealed) shut to provide a final seal.

Once filling is completed as described above, the assembly of the differential pressure transmitter 101 and the replaceable dual remote seal system 100 would be at risk of losing both seals of the precisely controlled isolator fluid quantities if the entire plate stack 190 were to be removed from the differential pressure transmitter 101 for replacement of one side only. The split along the central split line 192, however, permits replacement of only one side without loss of isolator fluid on the other side.

In summary, FIGS. 1A, 1B illustrate the seal system 100 coupled to the coplanar inlet plate 114 that includes high and low side diaphragms 116, 118 and coplanar inlet plate bolt holes 120, 122, 124, 126. The first plate assembly 170 includes first plate assembly bolt holes 173, at least some of which are alignable with the coplanar inlet plate bolt holes 120, 122 124, 126, and first high and low side isolator fluid passages 175 that are alignable with the high and low side diaphragms 116, 118. The second plate assembly 172 is stacked on the first plate assembly 170 to form a plate stack that includes the first and second plate assemblies 170, 172. The second plate assembly 172 includes second plate assembly bolt holes 179 aligned with at least some first plate assembly bolt holes. The high and low side capillary connectors 160, 164 connect to the plate stack 190. The high and low side capillary connectors 160, 164 have second high and low side isolator fluid passages 181 that align with the first high and low side fluid passages 175. High and low side capillary tubes 158, 162 connect to the high and low side capillary connectors 160, 164. High and low side remote seals 150, 152 connect to the high and low side capillary tubes 158, 160. The plate stack 190 (stack of plates assemblies 170, 172) includes the central split line 192 separating high and low sides of at least one of the first and second plate assemblies 170, 172 that enables separate replacement of high side components while avoiding replacing low pressure side components. Likewise, the central split line 192 that separates high and low sides enables separate replacement of low pressure side components while avoiding replacement of high pressure side components. The seal system 100 comprises high and low side bolts 174, 176 and the separate replacement of high side pressure components, for example, comprises temporary removal of at least some high side bolts 174. The alignment of the low side first and second isolator fluid passages 175, 181 is undisturbed during replacement of high side components.

Examples of stacks of first and second plate assemblies that provide separate reparability are described in more detail below in connection with an embodiment in FIGS. 2A-2E, and an embodiment in FIGS. 3A-3E. Optional connection configurations that have high parts commonality with FIGS. 1A-1B, FIGS. 2A-2E or FIGS. 3A-3E are described in more detail below with respect to FIGS. 6-7 and 10-11. The high parts commonality provides for economical replacement of a separately replaceable dual seal system with a single seal system, and vice versa during process plant upgrades.

Figure 2A:
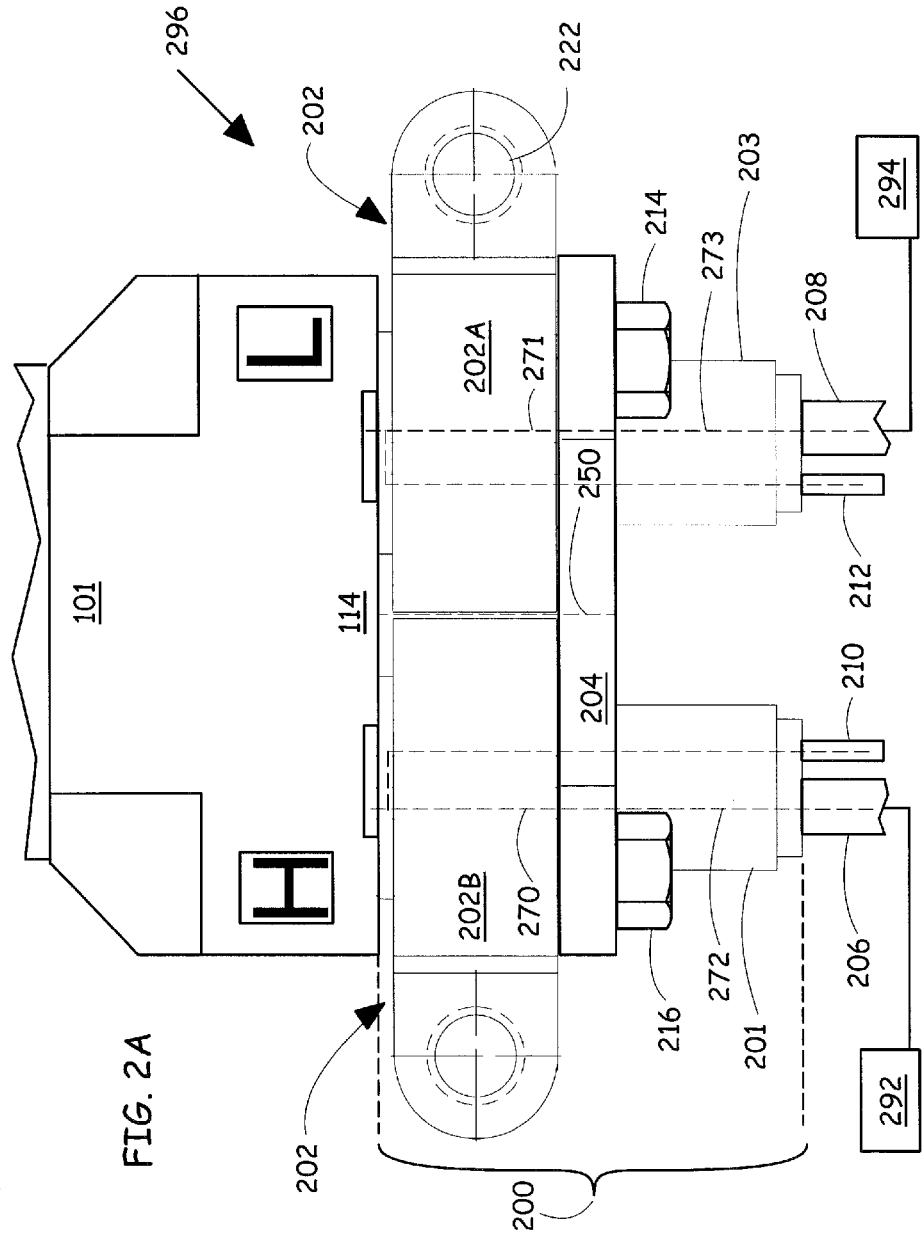
FIGS. 2A-2E illustrate an embodiment of a replaceable dual remote seal system.

FIG. 2A illustrates a replaceable dual remote seal system 296. The replaceable dual remote seal system 296 includes remote seals 292, 294 (comparable to remote seals 150, 152 in FIG. 1B). The replaceable dual remote seal system 296 includes a plate stack 200. A front elevational view of the plate stack 200 is shown in FIG. 2A. The plate stack 200 includes a first plate assembly 202 (comparable to the first plate assembly 170 in FIG. 1B) and a second plate assembly 204 (comparable to the second plate assembly 172 in FIG. 1B). In FIG. 2A, The plate stack 200 is shown in an operational position bolted by bolts 214, 216 to a coplanar inlet plate 114 of a differential pressure transmitter 101 and connected by capillary connectors 201, 203 to capillaries 206, 208 (comparable to capillary tubes 158, 162 in FIG. 1B). The capillaries 206, 208 connect to the remote seals 292, 294. The capillary connectors 201, 203 include process fill tubes 210, 212 that are used in an initial manufacturing process for filling the replaceable dual remote system 296 with isolator fluids, and then the process fill tubes 210, 212 are sealed shut to provide final sealing of the isolator fluids.

As illustrated in FIG. 2A, the first plate assembly 202 is split along a central split line 250 into two half plate assemblies 202A, 202B. Optional mounting holes 222 are provided on each half plate assembly 202A, 202B.

Figure 2B:
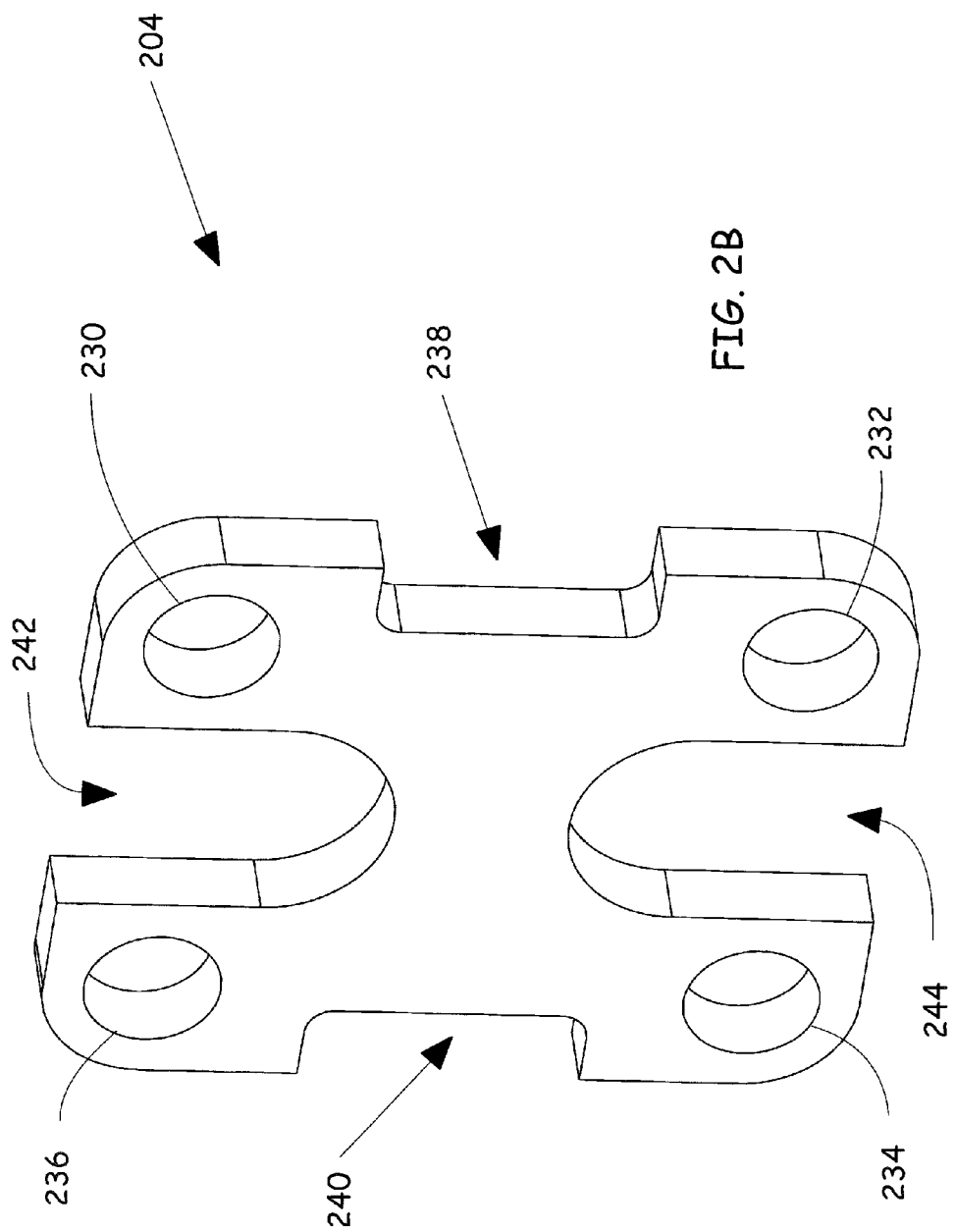

FIG. 2B illustrates an oblique view of the second plate assembly 204, also called compression plate 204. The second plate assembly 204 includes a pattern of through holes 230, 232, 234, 236 that align with the pattern of bolt holes 120, 122, 124, 126 shown in FIG. 1A. The second plate assembly 204 includes U-shaped slots 242, 244 that align with the capillary connectors 201, 203 in FIG. 2A. The second plate assembly 204 includes cutout notches 238, 240. The cutout notches 238, 240 and the U-shaped slots 242, 244 function as available access opening for applying a clamping tool (not illustrated) to one half plate assembly (low or high, 202A or 202B) of the underlying first plate assembly 202 during a replacement procedure. The access openings 238, 240 can alternatively be provided as round through-holes instead of as cutout notches.

During normal operation, the second plate assembly 204 applies a compressive sealing force to both half plate assemblies 202A, 202B of the underlying first plate assembly 202. During a replacement procedure, the clamping tool is applied to hold a first half plate assembly (such as 202A) of the first plate assembly 202 in a sealed position while a second half plate assembly (such as 202B) of the first plate assembly 202 is removed for replacement as described in more detail below in connection with FIG. 2E. During the replacement procedure, bolts such as bolts 214, 216 can be removed while the tool is used to provide tool clamping that substitutes for bolt clamping.

Figure 2C:
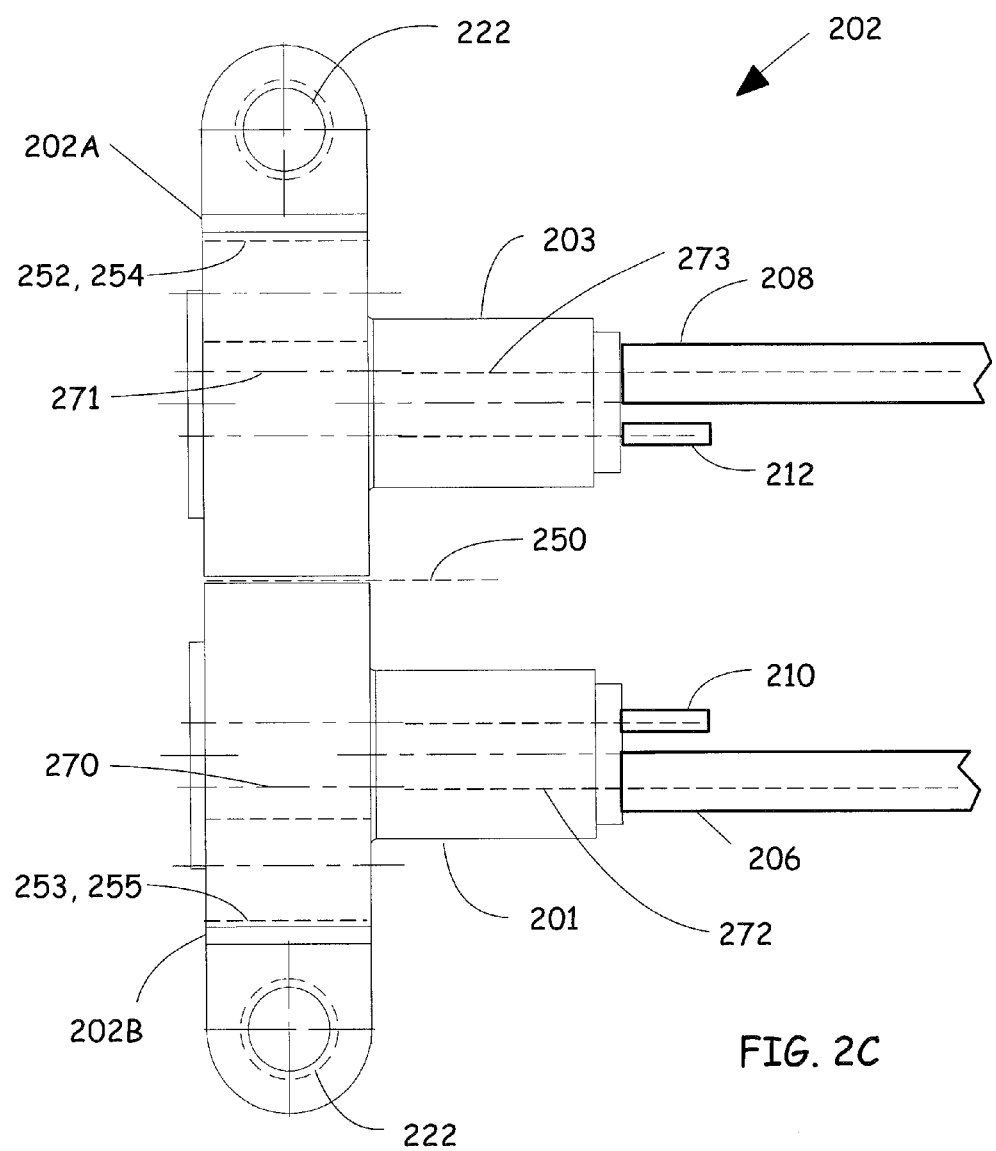

FIG. 2C illustrates a front view of the first plate assembly 202. The first plate assembly includes two separate half plate assemblies 202A, 202B that are separated by a central split line 250. Each half plate assembly 202A, 202B includes an optional mounting hole 222.

The capillary connectors 201, 203 are permanently attached and sealed to the capillary tubes 206, 208 and permanently attached and sealed to the half plate assemblies 202A, 202B. The capillary connectors 201, 203 are not removable and are not rotatable relative to the half plate assemblies 202A, 202B. The capillary connectors 201, 203 are not FAUs.

Figure 2D:
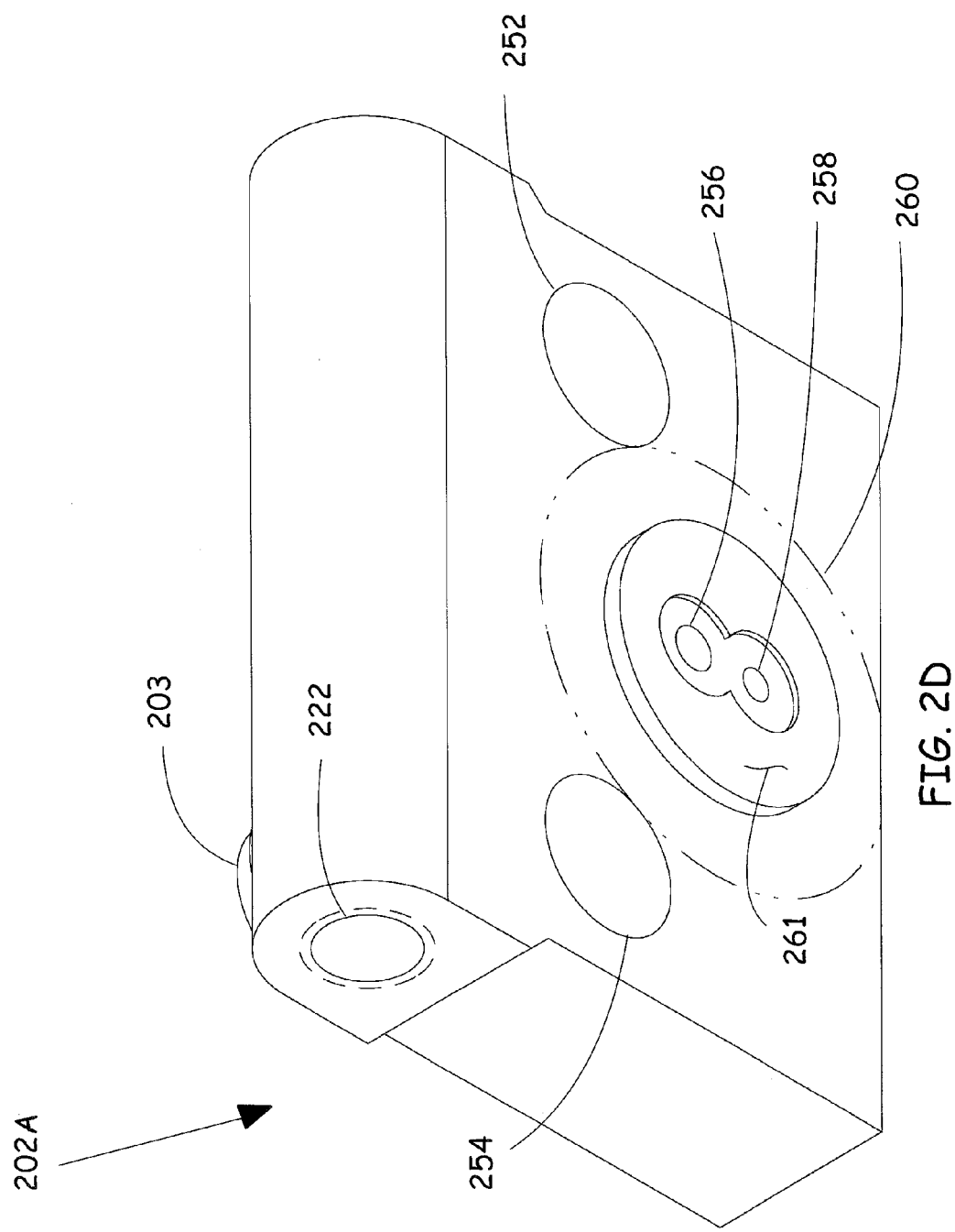

FIG. 2D illustrates an oblique view of a half plate assembly 202A. The half plate assembly 202A includes an opening 256 into the capillary connector 203 that conveys pressurized isolator fluid from the capillary tube 208 (FIGS. 2A, 2C) to the transmitter's miniature isolator diaphragm 116 (FIGS. 1A, 1B). The half plate assembly 202A includes an opening 258 into the capillary connector 203 that conveys pressurized isolator fluid from the process fill tube 212 (FIGS. 2A, 2C) to the transmitter's miniature isolator diaphragm 116 (FIGS. 1A, 1B). The half plate assembly 202A includes bolt holes 252, 254 for mounting bolts such as mounting bolt 214 (FIG. 2A). The half plate assembly 202A includes a seal 260 that is compressed when bolts are tightened. The half plate assembly 202A includes a raised boss 261 that supports an inner diameter of the seal 260. The half plate assembly 202B is essentially identical to the half plate assembly 202A.

Figure 2E:
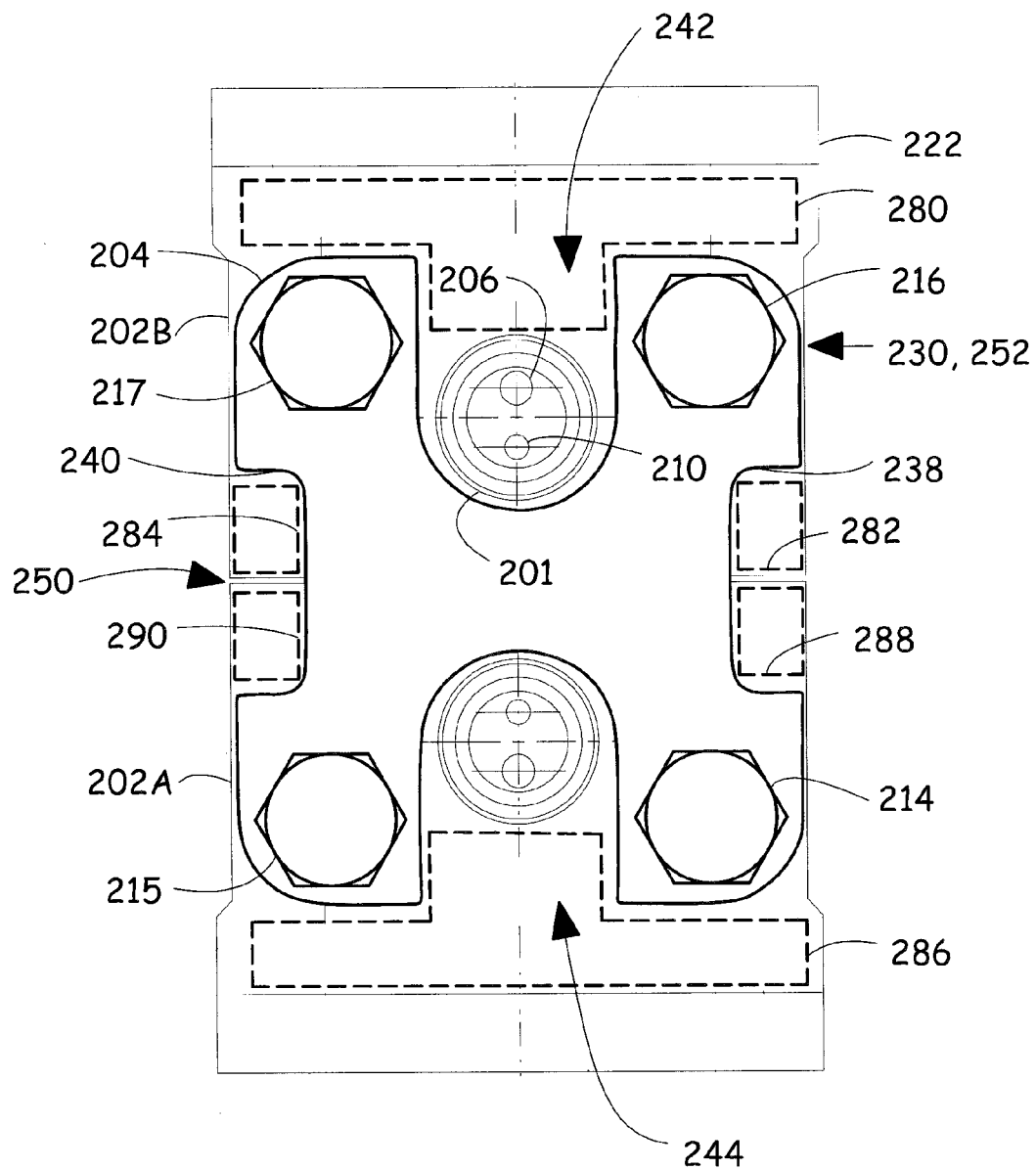

FIG. 2E illustrates a bottom view of the plate stack 200 in FIG. 2A. The second plate assembly 204 includes cutout notches 238, 240 and U-shaped slots 242, 244 (FIG. 2B) that expose tool force contact areas 280, 282, 284 on the half plate assembly 202B.

A tool (such as an arbor press, not illustrated) can be used to press down selectively on contact areas 280, 282, 284 to compress the half plate assembly 202B against the coplanar inlet plate 114 to maintain sealing. The four bolts 214, 215, 216, 217 can then be loosened or removed in order to remove half plate assembly 202A for replacement, without disturbing the sealing of the half plate assembly 202B. Likewise, a tool can be used to press down selectively on contact areas 286, 288, 290 to compress the half plate assembly 202A to maintain sealing when the half plate assembly 202B is removed, to provide separate reparability.

With the temporary use of a tool to provide compressive force, the bolts 214, 215, 216, 217 can be temporarily removed to permit replacement of only one side of the isolation system, without disturbing the other side of the isolation system.

In summary, FIGS. 2A-2E illustrate the seal system 296 coupled to a coplanar inlet plate 114. A first plate assembly 202 includes first plate assembly bolt holes 252, 254, 253, 255 (FIG. 2C) aligned with coplanar inlet plate bolt holes 120, 122, 124, 126. The first plate assembly 202 includes first high and low side isolator fluid passages 270, 271 (FIGS. 2A, 2C) that are aligned with the high and low side isolator diaphragms 116, 118 (FIG. 1A). The second plate assembly 204 is stacked on the first plate assembly 202 and includes second plate assembly bolt holes 230, 232, 234, 236 (FIG. 2B) aligned with first plate assembly bolt holes 252, 254, 253, 255. High and low side capillary connectors 201, 203 connect to the first plate assembly 202 and include second high and low side isolator fluid passages 272, 273 that align with the first high and low side fluid passages 270, 271. High and low side capillary tubes 206, 208 (also called capillaries) connect to the high and low side capillary connectors 201, 203. High and low side remote seals 292, 294 connect to the high and low side capillary tubes 206, 208. The first plate assembly 202 includes the central split line 250 separating high and low side parts 202A, 202B of the first plate assembly 202. The separation enables separate replacement of high pressure side components (such as 202B, 201, 206, 292) while avoiding replacing low pressure side components (such as 202A, 203, 208, 294, and vice versa. The seal system 296 comprises high and low side bolts 214, 215, 216, 217 and the separate replacement of high side pressure components comprises temporary removal of at least some high side bolts 216, 217. The alignment and sealing of the low side first and second isolator fluid passages 271, 273 are undisturbed during replacement of high side components. The second plate assembly 204 includes high and low side openings 238, 240, 242, 244 that expose contact areas of the first plate assembly 202.

FIG. 3A illustrates a replaceable dual remote seal system 396. The replaceable dual remote seal system 396 includes remote seals 392, 394 (comparable to remote seals 150, 152 in FIG. 1B). The replaceable dual remote seal system 396 includes a plate stack 300. A front elevational view of a plate stack 300 is shown. The plate stack 300 includes a first plate assembly 302 (comparable to the first plate assembly 170 in FIG. 1) and a second plate assembly 304 (comparable to the second plate assembly 172 in FIG. 1). The second plate assembly 304 is split along a central split line 350 between the high (H) and low (L) sides. The second plate assembly 304 includes a first half plate 304A and a second half plate 304B. In FIG. 3A, the plate stack 300 is shown in an operational position bolted by bolts 314, 316 to a coplanar inlet plate 114 of a differential pressure transmitter 101. The plate assemblies 302, 304 are bolted to one another by bolts 311, 313.

The first plate assembly 302 includes internal bores 307, 309 that convey isolation fluids to the miniature isolation diaphragms 116, 118 on the differential pressure transmitter 101. The first plate assembly 302 includes one or more mounting holes 322. The second plate assembly 304 is integrally and non-rotatably connected to capillary connectors 301, 303. The capillary connectors 301, 303 are connected to capillary tubes 306, 308 (comparable to capillary tubes 158, 162 in FIG. 1B). The capillary tubes 306, 308 connect to the remote seals 392, 394. The capillary connectors 301, 303 includes process fill tubes 310, 312 that are used for filling the replaceable dual remote system 396 with isolator fluids, and then the fill tubes 310, 312 are sealed shut to provide final sealing of the isolator fluids.

Figure 3B:
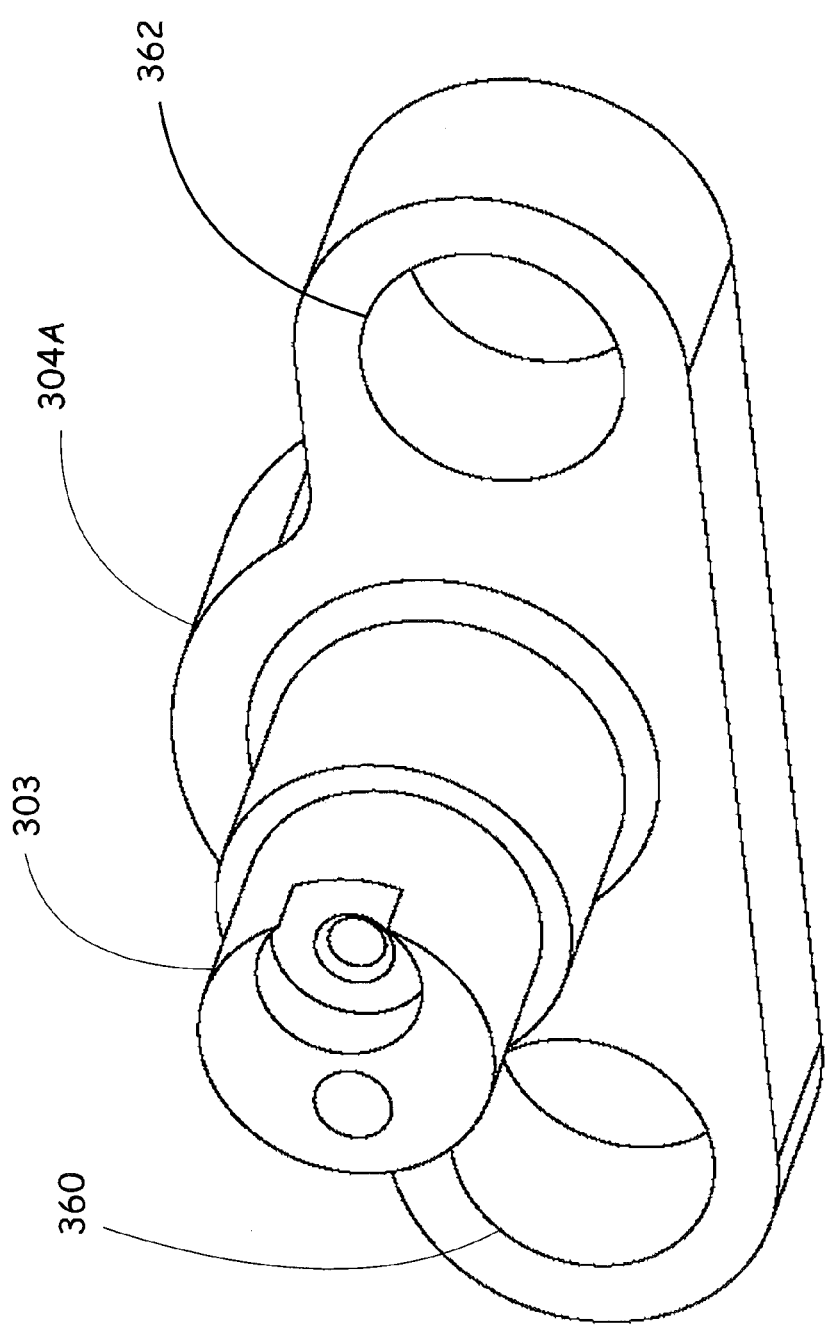

As illustrated in FIG. 3B, the first half plate 304A is integrally connected to the capillary connector 303. The first half plate 304A includes bolt holes 360, 362 for receiving bolts such as bolts 311, 321 (FIGS. 3A, 3E). The second half plate 304B (FIG. 3A) is similar to the illustrated first half plate 304B.

Figure 3C:
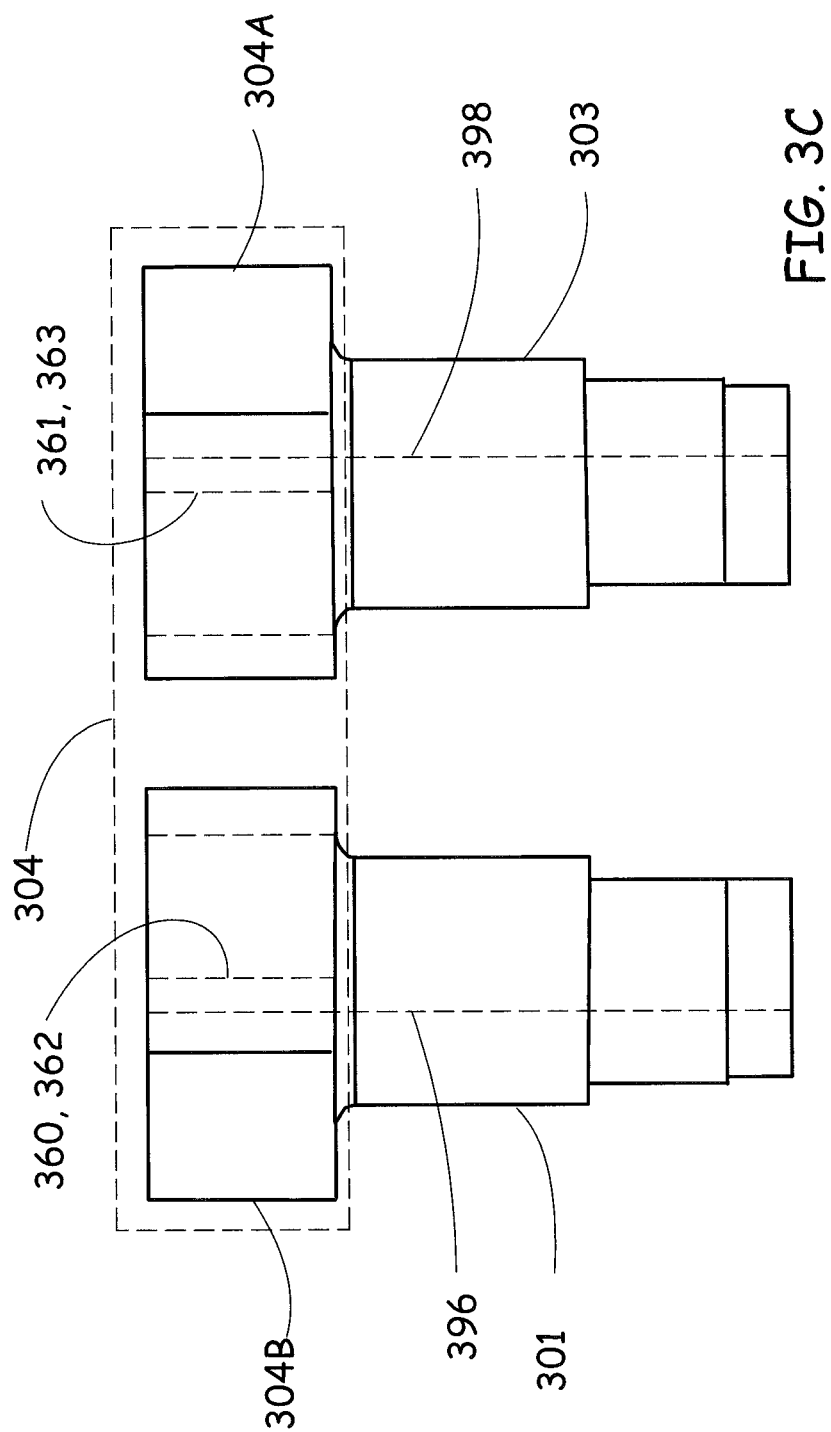

FIG. 3C is a front elevational view of the second plate assembly 304. The second plate assembly 304 includes first half plate 304A and second half plate 304B. The capillary connectors 301, 303 are integrally and non-rotatably attached the half plates 304A, 304B as illustrated.

Figure 3D:
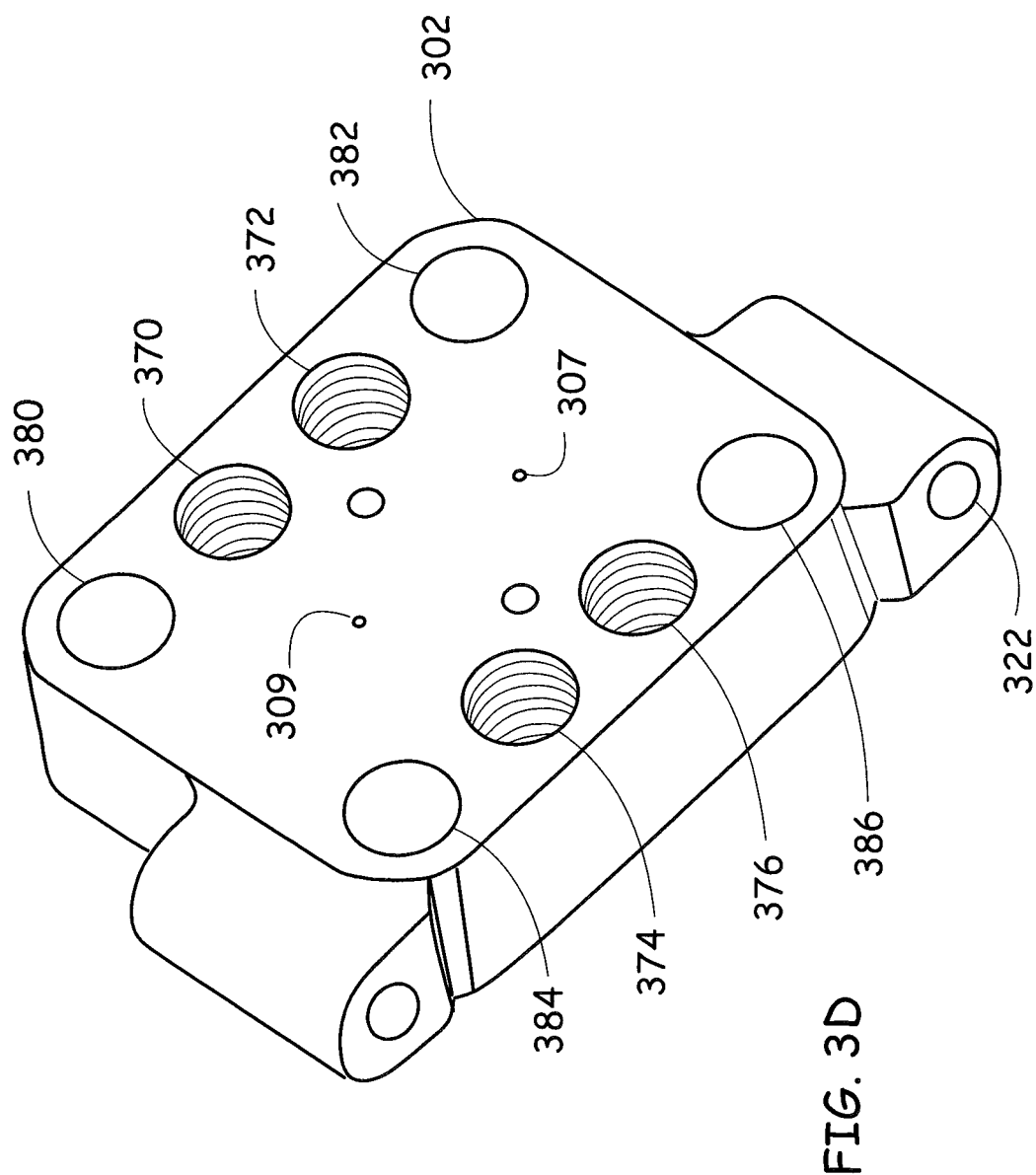
Figure 3E:
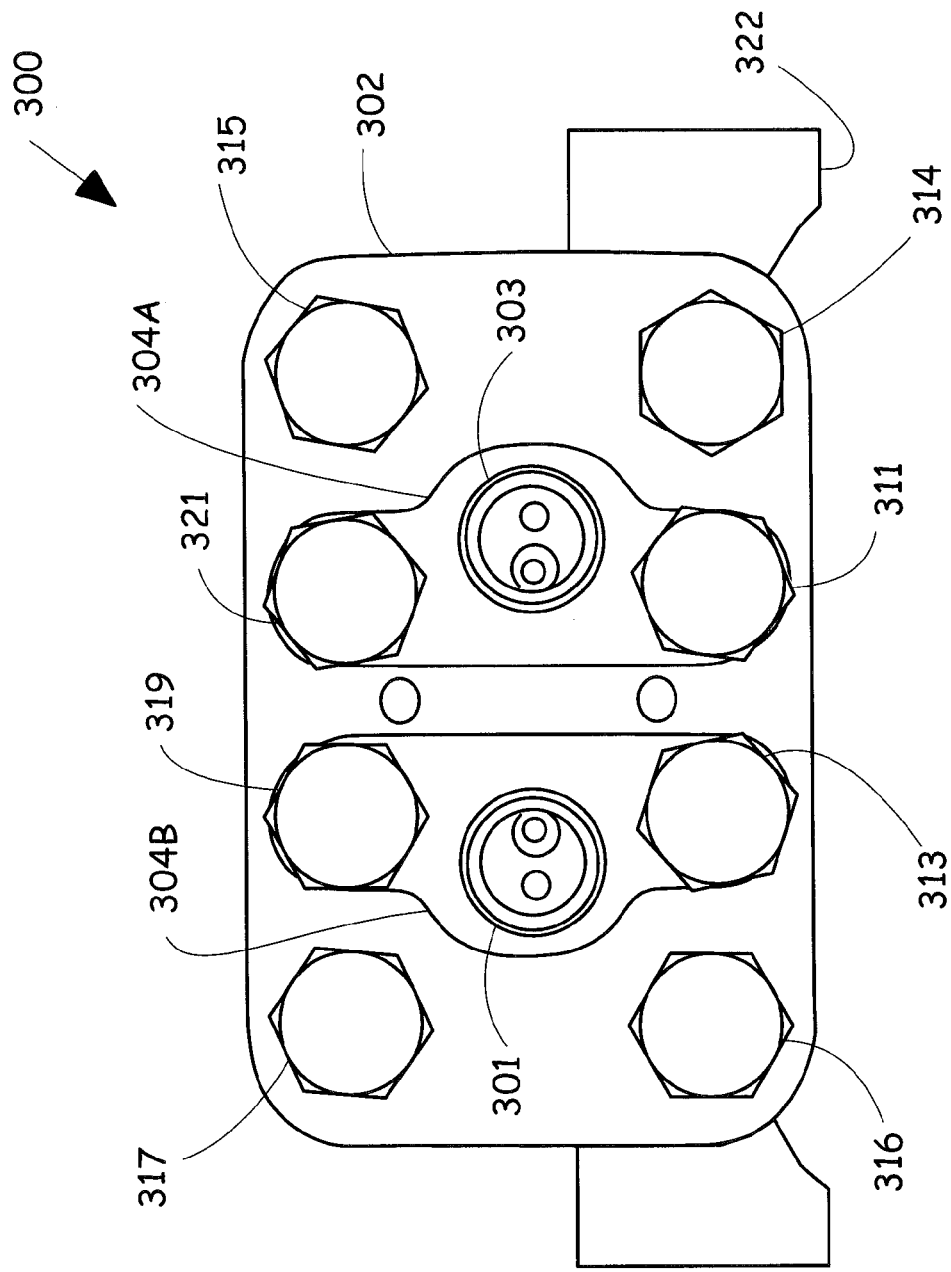

FIG. 3D is an oblique view of the first plate assembly 302. The first plate assembly 302 comprises a single, contiguous plate body. The first plate assembly 302 includes internal bores 307, 309 for conveying pressurized isolator fluid. The first plate assembly 302 includes bolt holes 370, 372, 374, 376 which are threaded for receiving threaded ends of bolts 311, 313, 319, 321 (FIGS. 3A, 3E). The first plate assembly 302 includes through bores 380, 382, 384, 386 which are clearance holes for bolts 314, 315, 316, 317 (FIGS. 3A, 3E) to pass through. The first plate assembly includes mounting holes 322.

FIG. 3E illustrates a bottom view of the plate stack 300. The plate stack 300 is secured to the coplanar inlet plate 114 (FIG. 1A) by bolts 314, 315, 316, 317 that pass through the first plate assembly 302 and that are threaded into threaded holes 120, 122, 124, 126 (FIG. 1A) in the coplanar inlet plate 114. The first and second half plates 304A, 304B are secured to the first plate assembly 302 by bolts 311, 313, 319, 321 that are threaded into threaded holes in the first plate assembly 302.

During original manufacture of the replaceable dual remote seal system 396 of FIGS. 3A-3E, the dual remote seal system 396 is assembled with bolts to the coplanar inlet plate on the pressure transmitter to form high and low side isolator systems that are closed (sealed) except for high and low side process fill tubes 310, 312, and the remote isolator process fill tubes, which are open. After assembly, the assembled high and low side systems are evacuated and are filled with clean isolator fluids through the fill tubes 310, 312. The quantities of isolator fluids in each side of the dual remote seal system 396 are adjusted to provide precisely controlled isolator fluid quantities that expand remote isolator diaphragms of the remote isolators 392, 394 so that the remote isolator diaphragms are near a midrange of slack deflection ranges of the remote isolator diaphragms, and then the fill tubes 310, 312, and remote isolator process fill tubes are closed (sealed) shut.

Once original filling of the replaceable dual remote seal system 396 is completed as described above, the assembly of the pressure transmitter 101 and the replaceable dual remote seal system 396 would be at risk of losing some of the precisely controlled isolator fluid quantities if bolts 314, 315, 316, 317 were to be unscrewed in the field. With the use of other bolts 311, 313, 319, 321 to provide compressive force between the second plate assembly 304 and the first plate assembly 302, however, a selected group of only two bolts 313, 319 can be removed to permit replacement of only one side (high side) of the isolation system, without disturbing the seal of the other side (low side) of the isolation system.

With the arrangement shown, the high side can be replaced without breaking a seal on the low side. With the arrangement shown, the low side can be replaced without breaking a seal on the high side. With the arrangement shown, the high and low sides of the system 396 are separately replaceable.

In summary, the seal system 396 shown in FIGS. 3A-3E, is coupled to a coplanar inlet plate 114 that includes high and low side diaphragms 116, 118 and coplanar inlet plate bolt holes 120, 122, 124, 126. The first plate assembly 302 includes first plate assembly bolt holes 380, 382, 384, 386, 370, 372, 374, 376, at least some of which (380, 382, 384, 386) are aligned with the coplanar inlet plate bolt holes 120, 122, 124, 126. The first plate assembly 302 includes first high and low pressure isolator fluid passages 307, 309 that are aligned with the high and low side diaphragms 116, 118. The second plate assembly 304 is stacked on the first plate assembly 302, and includes second plate assembly bolt holes 360, 362, 361, 363 (FIG. 3C) aligned with first plate assembly threaded bolt holes 370, 372, 374, 376. High and low side capillary connectors 301, 303 connect to the second plate assembly 304. The high and low side capillary connectors 301, 303 include second high and low side isolator fluid passages 396, 398 aligned with the first high and low side isolator fluid passages 307, 309. High and low side capillary tubes 306, 308 connect to the high and low side capillary connectors 301, 302. High and low side remote seals 392, 394 connect to the high and low side capillary tubes 306, 308. The second plate assembly 304 is split along a central split line 350 into separate high and low parts 304A, 304B, enabling separate replacement of high pressure side components (304B, 301, 306, 392) while avoiding replacing low pressure side components (304A, 303, 308, 394), and vice versa. The seal system 396 comprises high and low side bolts and the separate replacement of high side pressure components comprises temporary removal of at least some high side bolts (313, 319). The alignment of the low side first and second isolator fluid passages 307, 398 is undisturbed during replacement of high side components. A first pattern of four bolts 314, 315, 316, 317 attach the first plate assembly 302 to the inlet plate 114. A second pattern of four bolts 311, 312, 319, 321 attach the second plate assembly 304 to the first plate assembly 302.

Figure 4:
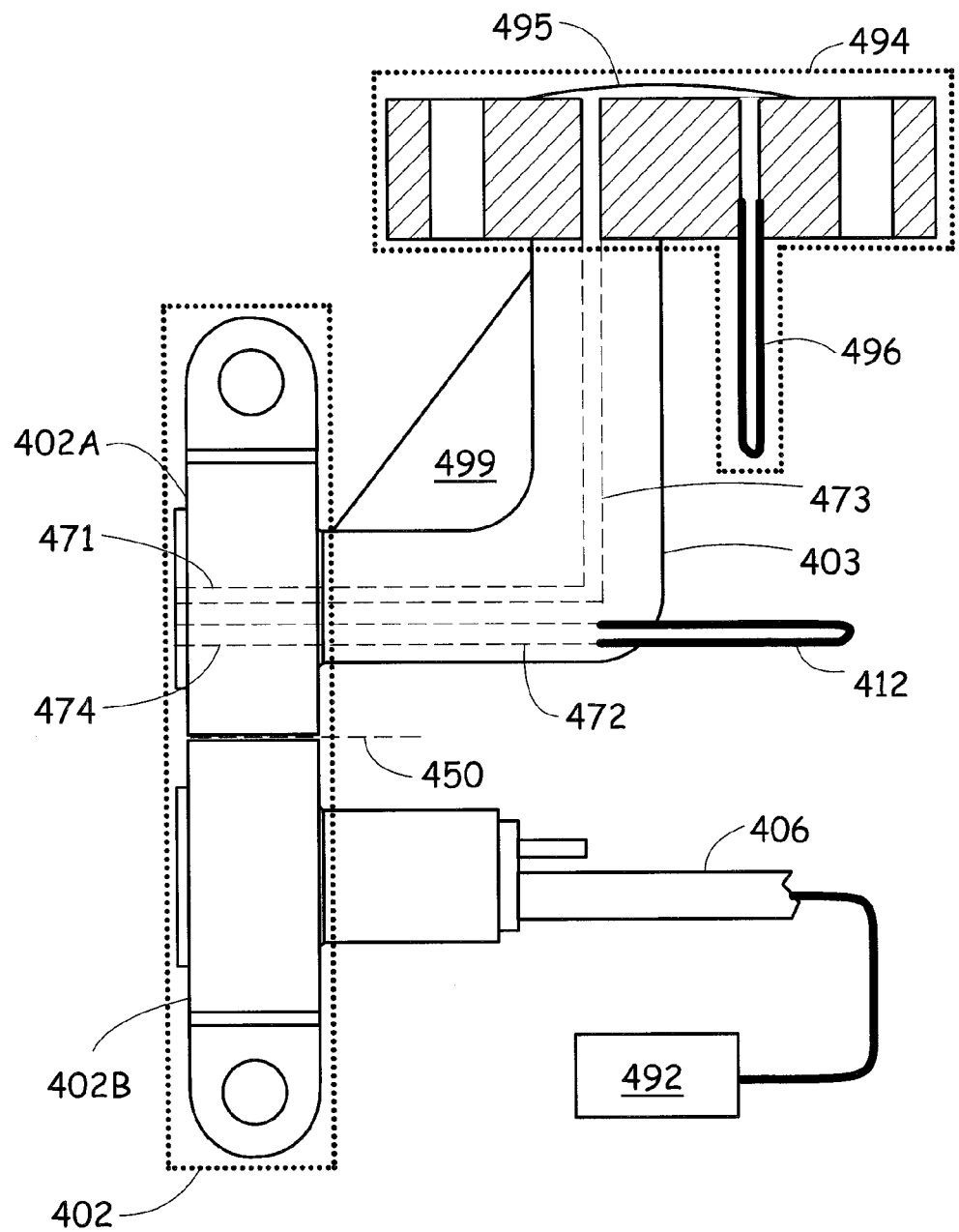
FIG. 4 illustrates an embodiment of a replaceable dual seal system with a remote seal and a local seal.

FIG. 4 illustrates a front view of a first plate assembly 402 with a central split line 450. The first plate assembly 402 comprises a high side half plate assembly 402B that is coupled via a capillary tube 406 to a remote seal 492. The high side half plate assembly 402B is identical to the half plate assemblies 202A, 202B illustrated in FIGS. 2A, 2C, 2E.

The first plate assembly 402 comprises a low side half plate assembly 402A that is rigidly connected with a local seal 494. The local seal 494 includes a local seal isolator diaphragm 495 and a process fill tube 496 and is similar to remote seals 154, 156 (FIG. 1) except that it is locally mounted to low side half plate assembly 402A and does not require an external capillary for connection to low side half plate assembly 402A, but instead uses an internal capillary passageway. The local seal 494 is mounted to the low side half plate assembly 202A by a local connector 403 which is shaped in the form of a piping ell. A process fill tube 412 is connected to the local connector 403. According to one embodiment, the local connector 403 comprises a gusset plate 499 that increases mechanical strength of the local connector 403. An isolator fluid passage (capillary) 473 through the local connector 403 is filled with isolator fluid and connects the local seal 494 to the second half plate assembly 402A. A fluid passage (capillary) 471 connects the fluid passage 473 to an outlet of the second half plate assembly 402A. Fluid passages (capillaries) 472 and 474 connect the process fill tube 412 to an outlet of the low side half plate assembly 402A.

The first and second half plate assemblies 402A, 402B, taken together comprise a plate assembly 402. The plate assembly 402 can be substituted for plate assembly 202 (in FIGS. 2A, 2C) in applications where only a single remote seal (and also a local seal) are desired. According to one aspect, the plate assembly 402 is useful in tank level application where an isolator is needed to connect to process fluid on the low side that has a size of the diaphragm 495 that is larger than the miniature isolator diaphragms 116, 118 (FIG. 1) to improve accuracy with high process fluid viscosity or process fluid which is a slurry that might otherwise plug process piping.

Figure 5:
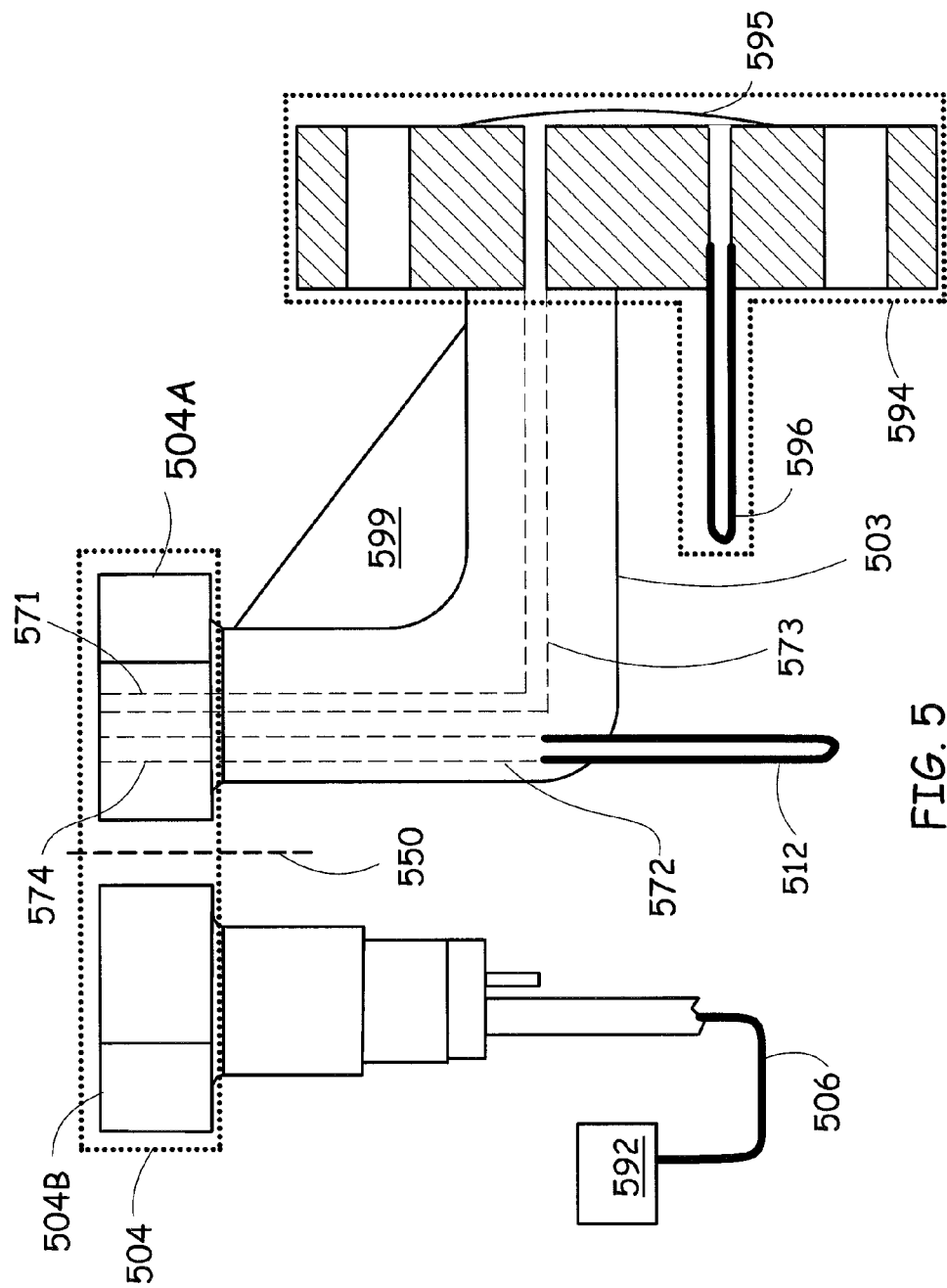
FIG. 5 illustrates an embodiment of a replaceable dual seal system with a remote seal and a local seal.

FIG. 5 illustrates a front view of a second plate assembly 504 with a central split line 550. The second plate assembly 504 comprises a high side half plate 504B that is coupled via a capillary tube 506 to a remote seal 592. The high side half plate 504B is identical to the half plates 304A, 305B illustrated in FIGS. 3A, 3B, 3E.

A low side half plate 504A does not include a capillary connector, but instead connects to a local connector 503 that couples between the low side half plate 504A and a local seal 594. The local seal 594 includes a local seal isolator diaphragm 595 and a process fill tube 596 and is similar to remote seals 154, 156 (FIG. 1) except that it is locally mounted to low side half plate 504A and does not require an external capillary tube for connection to the low side half plate assembly 504A. The local seal 594 is mounted to the low side half plate 504A by the local connector 503 which is shaped in the form of a piping ell. A process fill tube 512 is connected to the local connector 503. According to one embodiment, the local connector 503 comprises a gusset plate 599 that increases mechanical strength of the local connector 503. An isolator fluid passage (capillary) 573 through the local connector 403 is filled with isolator fluid and fluidly connects the local seal 594 to the low side half plate 504A. An isolator fluid passage (capillary) 571 connects the isolator fluid passage (capillary) 573 to an outlet of the low side half plate 504A. Fluid passages (capillaries) 572 and 574 fluidly connect the process fill tube 512 to an outlet of the low side half plate 504A.

The high and low side half plates 504A, 504B, taken together comprise the plate assembly 504. The plate assembly 504 can be substituted for plate assembly 304 (in FIGS. 3A, 3B, 3C, 3E) in applications where only a single remote seal (along with a local seal) is desired. According to one aspect, the plate assembly 504 is useful in tank level application where an isolator is needed to connect to process fluid on the low side that has a size for diaphragm 595 that is larger than the miniature isolator diaphragms 116, 118 (FIG. 1) to improve accuracy with high process fluid viscosity or process fluid which is a slurry that might otherwise plug process piping.

Figure 6:
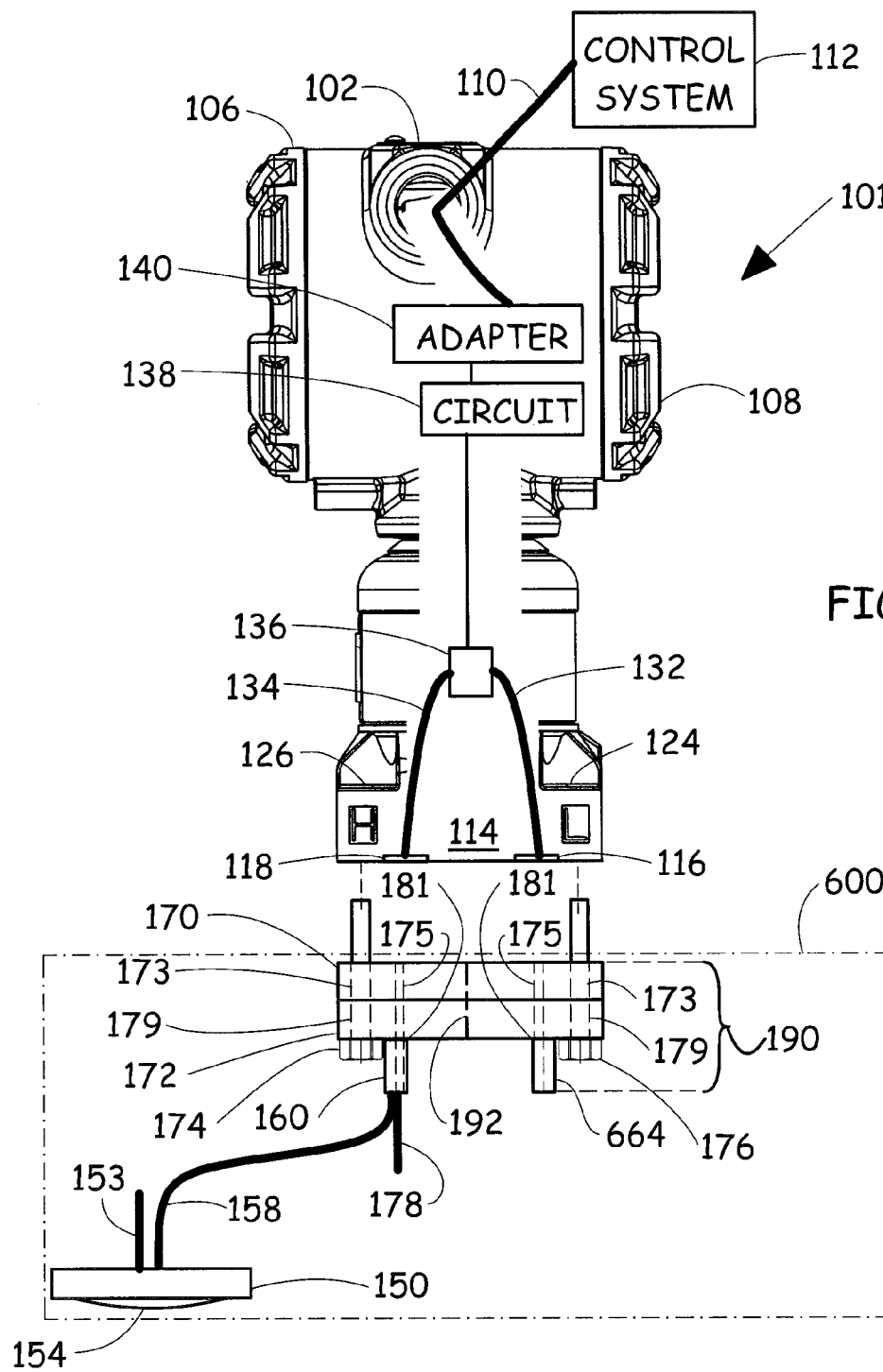
FIG. 6 illustrates a seal system with a single remote seal attached.

FIG. 6 illustrates a seal system 600 with only a single remote seal 150 attached. Reference numbers used in FIG. 6 that are the same as reference numbers used in FIG. 1B identify the same components.

The replaceable seal system 600 includes an atmospheric vent 664 (FIG. 6) instead of capillary connector 164 (FIG. 1B). In FIG. 6, the atmospheric vent 664 includes an axial through a hole (not illustrated in FIG. 6) that vents miniature isolator 116 to ambient atmospheric pressure in the surrounding environment. According to one aspect, the arrangement shown in FIG. 6 is useful in applications in which it is desired to obtain a gage pressure reading (pressure at remote isolator 153 relative to ambient pressure) from the differential pressure transmitter 101. "Gage pressure" means pressure measured relative to ambient pressure.

As future changes are made to the industrial process instrumentation plant, a need can arise during plant upgrades, to change a transmitter configuration from a gage pressure measurement (from a single remote isolator) to a differential pressure measurement between two isolators. Because of the replaceable arrangement provided in conjunction with the central split line 192 (FIG. 6), the seal system 600 is separately replaceable such that a remote or local isolator can be added to the low side of system 600 (replacing the atmospheric vent 664 with a capillary connector 164) without disturbing sealing of the high side, and vice versa.

While FIG. 6 presents a somewhat schematic illustration of the single seal system 600, it will be understood that the seal systems 100, 600 are implementable as disclosed in more detail in FIGS. 2A-E, and also as disclosed in FIGS. 3A-E. The single seal system arrangement in FIG. 6 has high parts commonality with separately replaceable dual seal system in FIGS. 1A, 1B, providing for high commonality of component parts, allowing for easy plant ungrade from one system to another.

Figure 7:
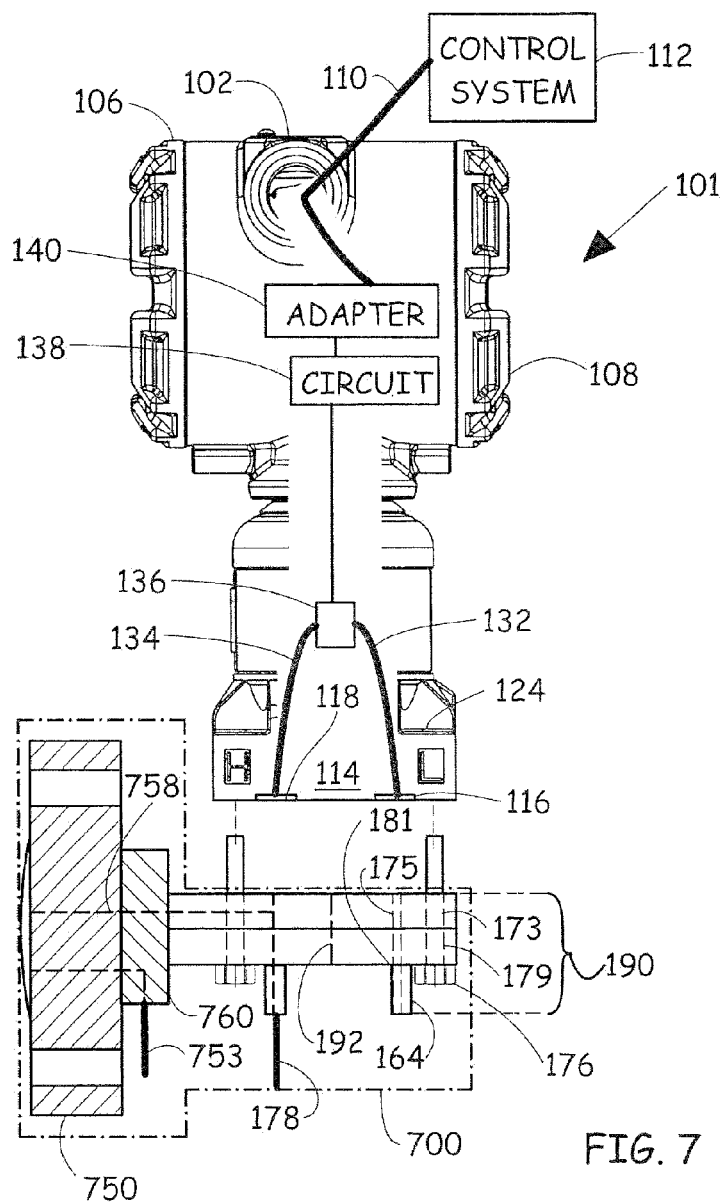
FIG. 7 illustrates a seal system with a single local seal attached.

FIG. 7 illustrates a seal system 700 that is similar to the seal system 600 in FIG. 6. The seal system 700 includes a local seal 750 with a process fill tube 753, while the seal system 600 includes a remote seal 150 with a process fill tube 153. Reference numbers used in FIG. 7 that are the same as reference numbers used in FIG. 6 identify the same components. The local seal 750 is fluidly coupled by isolator fluid in a capillary tube 758 (also called capillary passage 758) through capillary connector 760 to the inlet 118 of the transmitter 101.

While FIG. 7 presents a somewhat schematic illustration of a seal system 700, it will be understood that the seal systems 100, 700 are implementable as disclosed in more detail in FIGS. 2A-E, and also as disclosed in FIGS. 3A-E.

Figure 8:
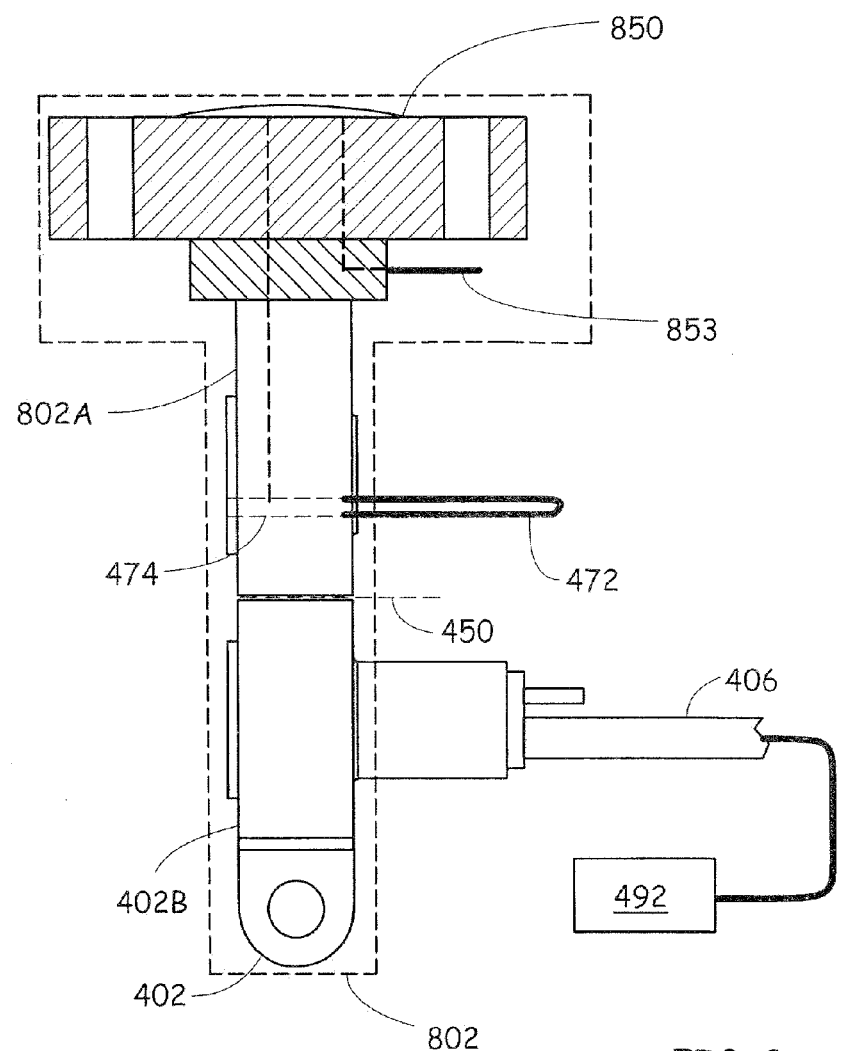
FIG. 8 illustrates an embodiment of a replaceable dual seal system with a remote seal and an attached local seal.

FIG. 8 illustrates a plate assembly 802 that is similar to the plate assembly 402 in FIG. 4. The plate assembly 802 includes a local seal 850 connected directly to the plate assembly 800, and a process fill tube 853, while the plate assembly 402 includes a local seal 494 with a process fill tube 496 and a local connector 403. Reference numbers used in FIG. 8 that are the same as reference numbers used in FIG. 4 identify the same or similar components. In FIG. 8, the local seal 850 is fluidly coupled by isolator fluid to the fluid passageway 474. The plate assembly 802 in FIG. 8 can be usefully substituted for the half plate assemblies 202A, 202B in FIG. 2E in applications in which a one local seal and one remote seal are desired.

Figure 9:
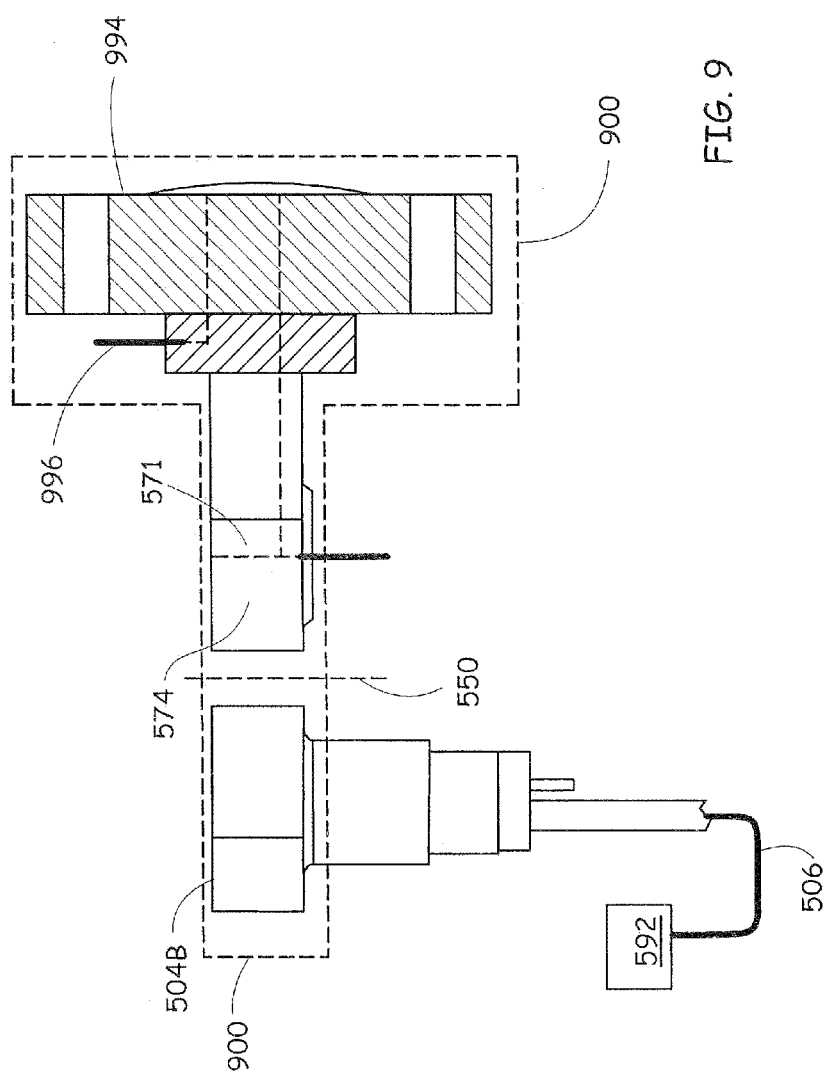
FIG. 9 illustrates a seal system with a single remote seal attached.

FIG. 9 illustrates a plate assembly 900 that is similar to the second plate assembly 504 in FIG. 5. The plate assembly 900 includes a local seal 994 connected directly to the plate assembly 900, and a process fill tube 996, while the plate assembly 504 includes a local seal 594 with a process fill tube 596 and a local connector 503. Reference numbers used in FIG. 8 that are the same as reference numbers used in FIG. 5 identify the same or similar components. In FIG. 9, the local seal 994 is fluidly coupled by isolator fluid to the fluid passageway 571. The plate assembly 900 in FIG. 9 can be usefully substituted for the half plate assemblies 304A, 304B in FIG. 3E in applications in which a one local seal and one remote seal are desired.

Figure 10:
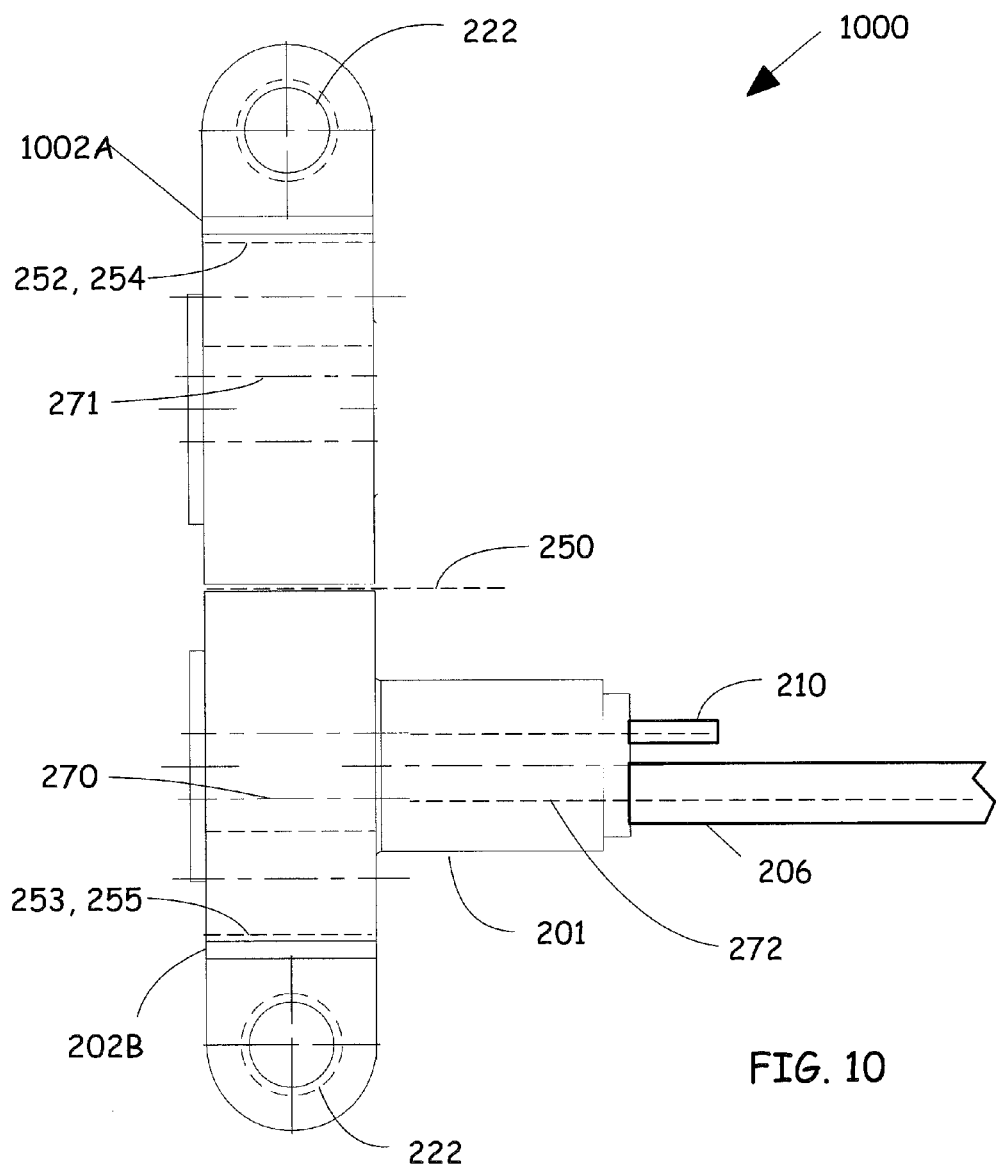
FIG. 10 illustrates a seal system with a single remote seal attached.

FIG. 10 illustrates a plate assembly 1000 that is similar to the plate assembly 202 in FIG. 2C. The plate assembly 1000 includes a half plate assembly 1002A and a half plate assembly 202B. The half plate assembly 1002A (FIG. 10) is similar to the half plate assembly 202A (FIG. 2C), except that the half plate assembly 1002A does not include an attached capillary adapter 203 (FIG. 2C). Reference numbers used in FIG. 10 that are the same as reference numbers used in FIG. 2C identify the same or similar components. In FIG. 10, the half plate assembly 1002A serves to vent one side of an attached pressure transmitter to ambient atmospheric pressure through passageway 271. The half plate assemblies 1002A, 202B in FIG. 10 can be usefully substituted, as part of a process plant upgrade, for the half plate assemblies 202A, 202B in FIG. 2E in applications in which one remote seal and one vent to ambient atmospheric pressure are desired.

Figure 11:
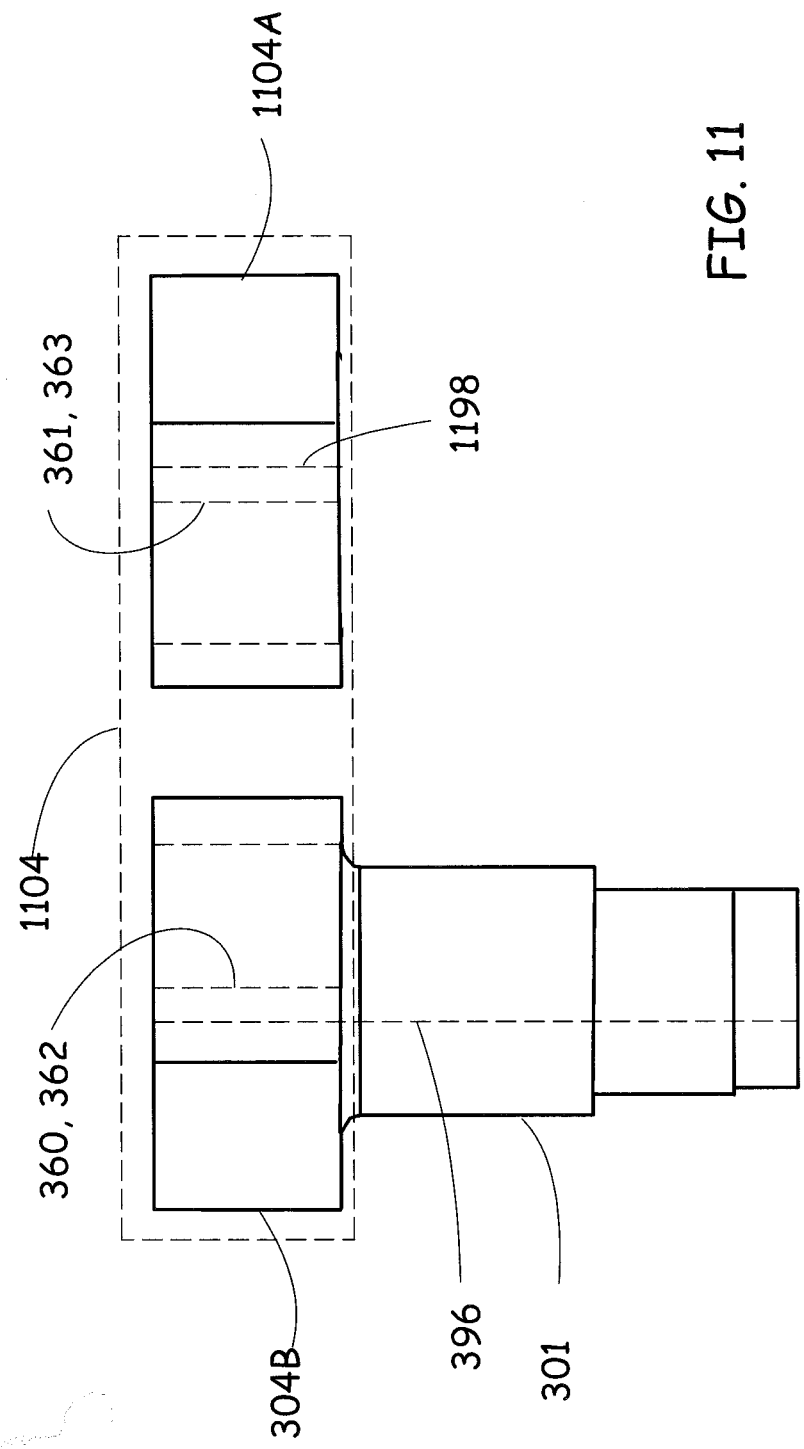
FIG. 11 illustrates an embodiment of a seal system with a single remote seal attached.

FIG. 11 illustrates a second plate assembly 1104 that is similar to the second plate assembly 302 in FIG. 3C. The plate assembly 1004 includes a first half plate assembly 1104A and a second half plate assembly 304B. The first half plate assembly 1104A (FIG. 11) is similar to the half plate assembly 304A (FIG. 3C), except that the first half plate assembly 1104A does not include an attached capillary adapter 303 (FIG. 3C). Reference numbers used in FIG. 11 that are the same as reference numbers used in FIG. 3C identify the same or similar components. In FIG. 11, the first half plate assembly 1104A serves to vent one side of an attached pressure transmitter to ambient atmospheric pressure through passageway 1198. The half plate assemblies 1002A, 202B in FIG. 11 can be usefully substituted for the half plate assemblies 304A, 304B in FIG. 3E in applications in which one remote seal and one vent to ambient atmospheric pressure are desired.

As disclosed above in FIGS. 1-11, the use of a dual plate arrangement provides a connection structure for remote seals that is also compatible with local seals and atmospheric vents to provide a useful unitary connection scheme using two plates and a high degree of parts commonality for the wide variety of separately replaceable process installation connections for use in fluid processing industrial installations.

The replaceable seal systems, as described above in this application, can also include the attached pressure transmitter, such as pressure transmitter 101.

Figure 12:
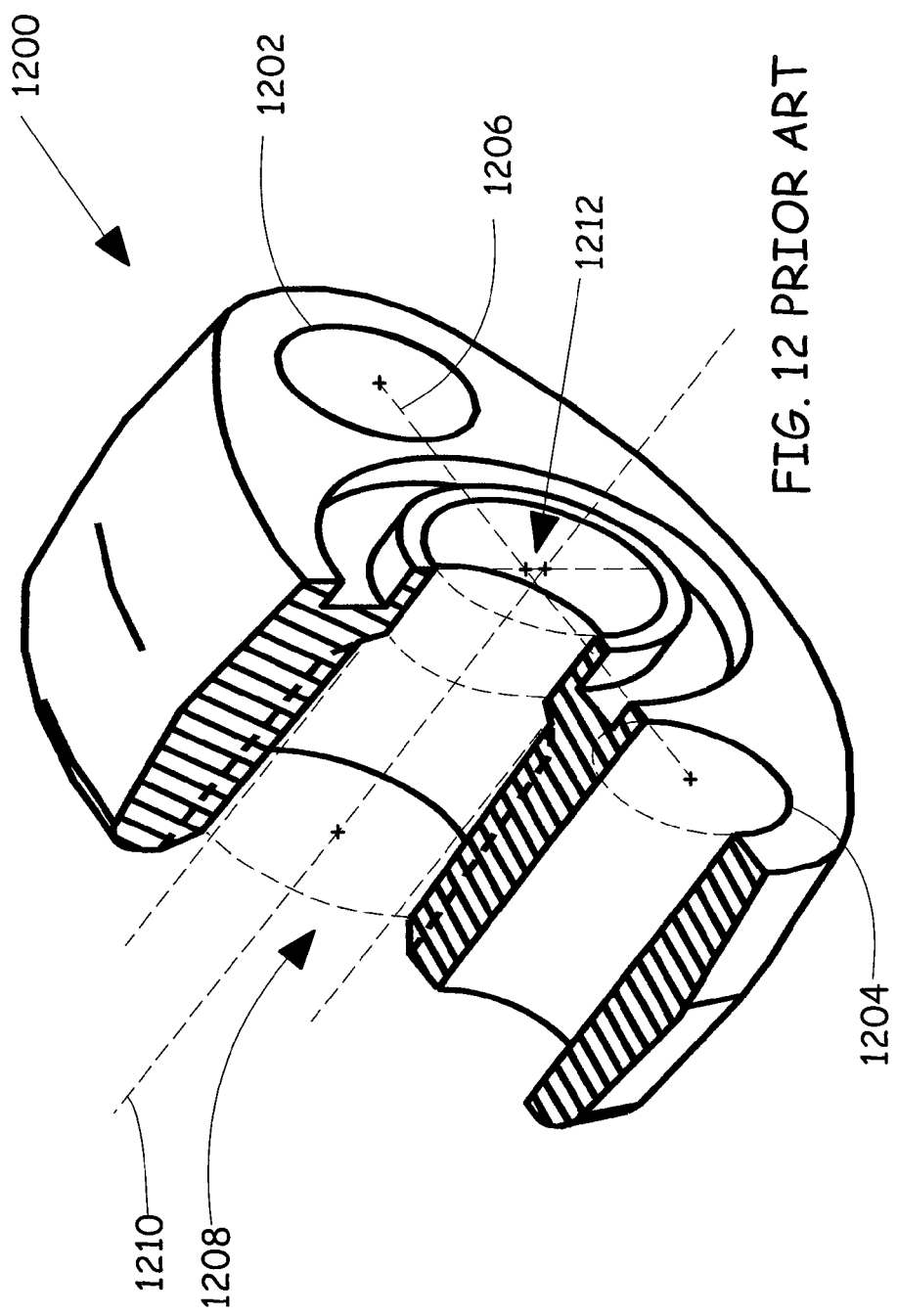
FIG. 12 illustrates a PRIOR ART drawing of a flange adapter union (FAU).

FIG. 12 illustrates a partially cutaway oblique view of a PRIOR ART flange adapter union (FAU) 1200. The flange adapter union 1200 includes a tapered threaded inlet 1208 for connection to a pipe with a tapered thread such as an NPT thread. The flange adapter union 1200 is rotatable on such a threaded pipe over a limited range of rotation as the FAU and the pipe are threaded together. The flange adapter union 1200 includes through holes 1202, 1204 for use with mounting bolts (not illustrated) for attachment to a flange, or to a coplanar inlet plate 114 (FIG. 1A). An axis 1210 of the tapered threaded inlet 1208 is offset by a distance 1212 from an axis 1206 through the centers of bolt holes 1202, 1204. A transmitter, such as transmitter 101, when not being used with a remote seal system, is compatible with direct connection to process fluid lines using flange adapter unions (FAUs). Flange adapter unions may be referred to informally as "football adapters" and have a generally oval-shaped outer profile.

A single, contiguous metal "flange plate" is interposed between the FAUs and the coplanar inlet plate 114 to provide sealing to the FAUs and to the coplanar inlet plate. Flange adapter unions are not parts of the replaceable dual remote seal systems 100, 296, 396. Flange adapter unions are not used with the seal systems described above in FIGS. 1-11.

Although the present invention has been described with reference to preferred embodiments, workers skilled in the art will recognize that changes may be made in form and detail without departing from the spirit and scope of the invention.

What is claimed is:

1. A seal system, couplable to a coplanar inlet plate of a pressure transmitter, the coplanar inlet plate including high and low side diaphragms and coplanar inlet plate bolt holes, the seal system comprising:
   a first plate assembly that includes first plate assembly bolt holes, at least some of which are alignable with the coplanar inlet plate bolt holes, and first high and low side isolator fluid passages that are alignable with the high and low side diaphragms;
   a second plate assembly that is stacked vertically on the first plate assembly to form a plate stack that includes the first and second plate assemblies, the second plate assembly including second plate assembly bolt holes aligned with first plate assembly bolt holes;
   high and low side capillary connectors connected to the plate stack, the high and low side capillary connectors having second high and low side isolator fluid passages that are aligned with the first high and low side isolator fluid passages;
   capillaries connected to the high and low side capillary connectors;
   seals that connect to the capillaries; and
   wherein the first plate assembly is split into a high side plate assembly including the first high side isolator fluid passage, and a low side plate assembly including the first low side isolator fluid passage, the high and low side plate assemblies being separately removable from the first plate assembly.

2. The seal system of claim 1, wherein the separability of high and low side plate assemblies enables separate replacement of a selected one of the first high and low side isolator fluid passages, while avoiding replacement of a non-selected one of the first high and low side isolator fluid passages.

3. The seal system of claim 1, wherein the seal system comprises high and low side bolts and the separate replacement of the high side plate assembly comprises temporary removal of at least some of the high side bolts.

4. The seal system of claim 1, wherein the alignment of the first and second low side isolator fluid passages is undisturbed during replacement of the high side plate assembly.

5. The seal system of claim 1 wherein the capillary connector includes a process fill tube.

6. The seal system of claim 1 wherein the first plate assembly bolt holes comprise a rectangular pattern of four bolt holes with bolt hole spacings that is less than 1.7 inches by 2.2 inches.

7. The seal system of claim 1 and further comprising the pressure transmitter.

8. A seal system that is couplable to a coplanar inlet plate of a pressure transmitter, the coplanar inlet plate including high and low side diaphragms and coplanar inlet plate bolt holes, the seal system comprising:

a first plate assembly including first plate assembly bolt holes, which are alignable with the coplanar inlet plate bolt holes, and first high and low side isolator fluid passages that are alignable with the high and low side diaphragms;

a second plate assembly stacked vertically on the first plate assembly and including second plate assembly bolt holes aligned with first plate assembly bolt holes;

high and low side capillary connectors that are connected to the first plate assembly, each of the high and low side capillary connectors including second high and low side isolator fluid passages that are aligned with the first high and low side isolator fluid passages;

high and low side capillariess that connect to the high and low side capillary connectors;

high and low side seals that connect to the high and low side capillaries; and wherein the first plate assembly is split into a high side plate assembly including the first high side isolator fluid passage, and a low side plate assembly including the first low side isolator fluid passage, the high and low side plate assemblies being separately removable from the first plate assembly.

9. The seal system of claim 8, wherein the separability of high and low side plate assemblies enables separate replacement of a selected one of the first high and low side isolator fluid passages, while avoiding replacement of a non-selected one of the first high and low side isolator fluid passages.

10. The seal system of claim 8, wherein the seal system comprises high and low side bolts and the separate replacement of the high side plate assembly comprises temporary removal of at least some of the high side bolts.

11. The seal system of claim 8 wherein the alignment of the first and second low side isolator fluid passages is undisturbed during replacement of the high side plate assembly.

12. The seal system of claim 8 wherein the capillary connectors include process fill tubes.

13. The seal system of claim 8 wherein the second plate assembly includes high and low side openings that expose contact areas of the first plate assembly.

14. The seal system of claim 8 and further comprising the pressure transmitter.

15. A seal system, couplable to a coplanar inlet plate including high and low side diaphragms and coplanar inlet plate bolt holes, the seal system comprising:

a first plate assembly including first plate assembly bolt holes, at least some of which are alignable with the coplanar inlet plate bolt holes, and first high and low side isolator fluid passages that are alignable with the high and low side diaphragms;

a second plate assembly stacked vertically on the first plate assembly and including second plate assembly bolt holes aligned with first plate assembly bolt holes;

high and low side capillary connectors connected to the second plate assembly, the high and low side capillary connectors including second high and low side isolator fluid passages aligned with the first high and low side isolator fluid passages;

high and low side capillaries connected to the high and low side capillary connectors;

high and low side seals connected to the high and low side capillaries; and wherein the second plate assembly is split into a high side plate assembly including at least one of the second plate assembly bolt holes, and a low side plate assembly including at least one of the second plate assembly bolt holes, the high and low side plate assemblies being separately removable from the second plate assembly.

16. The seal system of claim 15, wherein the separability of the high and low side plate assemblies enables separate replacement of a selected one of the high and low side plate assemblies, while avoiding replacement of a non-selected one of the high and low side plate assemblies.

17. The seal system of claim 15, wherein the seal system comprises high and low side bolts and the separate replacement of the high side plate assembly comprises temporary removal of at least one of the high side bolts.

18. The seal system of claim 15, wherein the alignment of the first and second low side isolator fluid passages is undisturbed during replacement of the high side plate assembly.

19. The seal system of claim 15 wherein the capillary connectors include process fill tubes.

20. The seal system of claim 15 comprising a first pattern of four bolts that attach the first plate assembly to the inlet plate, and a second pattern of four bolts that attach the second plate assembly to the first plate assembly.

21. The seal system of claim 15 and further comprising the pressure transmitter.

* * * * *